United States Patent [19]
Kaneishi et al.

[11] Patent Number: 5,656,234
[45] Date of Patent: Aug. 12, 1997

[54] MOLD APPARATUS AND INJECTION MOLDING METHOD FOR PRODUCING HOLLOW-STRUCTURED ARTICLE BY INJECTION MOLDING

[75] Inventors: Akimasa Kaneishi; Sinji Kiboshi; Isamu Mio, all of Hiratsuka; Michiyasu Fukui, Osaka, all of Japan

[73] Assignees: Mitsubishi Gas Chemical Company, Inc., Tokyo; Miyagawa Kasei Industry Co., Ltd., Osaka, both of Japan

[21] Appl. No.: 510,407

[22] Filed: Aug. 2, 1995

[30] Foreign Application Priority Data

Aug. 12, 1994 [JP] Japan .................................. 6-190565
Feb. 28, 1995 [JP] Japan .................................. 7-065133

[51] Int. Cl.⁶ .................................................... B29C 45/56
[52] U.S. Cl. .................................... 264/572; 425/130
[58] Field of Search ............................... 264/572, 328.7, 264/328.11, 45.2, 263, 318, 328.1; 425/130, 577

[56] References Cited

U.S. PATENT DOCUMENTS

| 3,809,733 | 5/1974 | Sandiford et al. ............... 264/328.7 |
| 4,075,266 | 2/1978 | Theysohn ........................ 264/328.7 |

FOREIGN PATENT DOCUMENTS

| 2079317 | 7/1992 | Canada . |
| 58-394425 | 3/1983 | Japan ........................ 264/328.7 |
| 60-83820 | 5/1985 | Japan ........................ 264/328.7 |
| 3-9820 | 1/1991 | Japan . |
| 5-84786 | 4/1993 | Japan . |
| 5-278076 | 10/1993 | Japan . |
| 5-301262 | 11/1993 | Japan . |
| 6-143318 | 5/1994 | Japan . |
| 6-315970 | 11/1994 | Japan . |
| 1177705 | 1/1970 | United Kingdom ........... 264/328.7 |

*Primary Examiner*—Catherine Timm
*Attorney, Agent, or Firm*—Wenderoth, Lind & Ponack

[57] ABSTRACT

An injection-molding method using an injection molding machine having a mold apparatus comprising (A) a fixed mold member,
(B) a movable mold member movable in the mold opening and closing directions,
(C) an intermediate mold member which is provided between the fixed mold member and the movable mold member and is slidable in the mold opening and closing directions between the fixed mold member and the movable mold member, and
(D) at least one intermediate mold member sliding means for sliding the intermediate mold member in the mold opening and closing directions, the method including the steps of injecting a molten resin into a cavity formed of cavity wall surfaces of the fixed mold member, the intermediate mold member and the movable mold member, and increasing the distance of the cavity by moving the movable mold member in the mold opening direction with keeping the intermediate mold member in intimate contact with the fixed mold member or the movable mold member by the intermediate mold member sliding means, and introducing a pressurized fluid into the molten resin in the cavity, thereby to form a hollow structure in the resin.

7 Claims, 39 Drawing Sheets

MOLD OPENING AND CLOSING DIRECTION

← MOLD OPENING DIRECTION

→ MOLD CLOSING DIRECTION

MOLD OPENING AND CLOSING DIRECTION

⟵ MOLD OPENING DIRECTION

⟶ MOLD CLOSING DIRECTION

MOLD OPENING AND CLOSING DIRECTION

MOLD OPENING DIRECTION

MOLD CLOSING DIRECTION

MOLD OPENING AND
CLOSING DIRECTION

←
MOLD OPENING DIRECTION

→
MOLD CLOSING DIRECTION

MOLD OPENING AND
CLOSING DIRECTION

MOLD OPENING DIRECTION

MOLD CLOSING DIRECTION

MOLD OPENING AND
CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

MOLD OPENING AND
CLOSING DIRECTION

MOLD OPENING DIRECTION

MOLD CLOSING DIRECTION

MOLD OPENING AND
CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

⟵⟶ MOLD OPENING AND CLOSING DIRECTION

⟵ MOLD OPENING DIRECTION

⟶ MOLD CLOSING DIRECTION

MOLD OPENING AND
CLOSING DIRECTION

MOLD OPENING DIRECTION

MOLD CLOSING DIRECTION

⟷
MOLD OPENING AND
CLOSING DIRECTION

⟵
MOLD OPENING DIRECTION

⟶
MOLD CLOSING DIRECTION

MOLD OPENING AND
CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

MOLD OPENING AND CLOSING DIRECTION

MOLD OPENING DIRECTION

MOLD CLOSING DIRECTION

MOLD OPENING AND
CLOSING DIRECTION

MOLD OPENING DIRECTION

MOLD CLOSING DIRECTION

⟵⟶ MOLD OPENING AND CLOSING DIRECTION

⟵ MOLD OPENING DIRECTION

⟶ MOLD CLOSING DIRECTION

MOLD OPENING AND CLOSING DIRECTION

MOLD OPENING DIRECTION

MOLD CLOSING DIRECTION

⟷ MOLD OPENING AND CLOSING DIRECTION

⟵ MOLD OPENING DIRECTION

⟶ MOLD CLOSING DIRECTION

MOLD OPENING AND
CLOSING DIRECTION

MOLD OPENING DIRECTION

MOLD CLOSING DIRECTION

MOLD APPARATUS AND INJECTION MOLDING METHOD FOR PRODUCING HOLLOW-STRUCTURED ARTICLE BY INJECTION MOLDING

BACKGROUND OF THE INVENTION AND RELATED ART

The present invention relates to a mold apparatus for producing a hollow-structured article by an injection molding method in which a pressurized fluid is introduced into a molten resin injected in a cavity of a mold and the volume of the cavity is expanded during the molding, and an injection molding method using the above mold apparatus.

For example, JP-A-3-9820 and JP-A-5-84786 disclose an injection molding method in which a molten resin is injected into a cavity formed in a mold, a pressurized fluid is introduced into the molten resin in the cavity while the distance of the cavity in the mold opening direction is increased for expanding the cavity volume, and the molten resin is cooled and solidified in the cavity, thereby to form a hollow-structured injection-molded article having a high hollowness ratio.

In the injection molding method disclosed in JP-A-3-9820, a mold 2 is composed of a fixed mold member 2a and a slidable mold member 2b. The volume of a cavity 8 is expanded by gradually sliding the mold member 2b while introducing a low pressure fluid into a molten synthetic resin 3 which has been injected into the cavity 8.

In the mold disclosed in JP-A-5-84786, a movable core 2 constituting a cavity wall surface on the movable mold member 1 side is provided such that it goes through the movable mold member 1 and is movable in the mold opening and closing directions. A mold opening and closing mechanism is connected to a support frame 3 fixed to the movable mold member 1, and a movable core movement mechanism 4 for moving the movable core 2 in the mold opening and closing directions is supported at a support frame 3. In the mold disclosed in JP-A-5-84786, the volume of a mold cavity 5 is expanded by the movement of a movable core 2 without moving the movable mold member 1.

When an injection-molded article is required to have high appearance characteristics, or when an injection-molded article having a thin rib or embossing as a design or for adding a certain function is produced, it is required to improve the imprintability of the design or embossing of the cavity wall surface to an injection-molded article surface. For this purpose, when a molten resin is injected into a cavity, it is required to press the molten resin on the cavity wall surface at a high pressure or to introduce a high pressure fluid into a molten resin in the cavity. However, when a high pressure fluid is introduced into the molten resin in the mold disclosed in JP-A-3-9820, a molten resin leaks through the parting faces of the mold members 2a and 2b, and a burr is liable to occur on the injection-molded article surface. Moreover, it is made difficult to control the sliding of the mold member 2b. JP-A-3-9820 is silent concerning any specific means of energizing the mold member 2b toward the fixed mold member 2a and of sliding the mold member 2b.

In the mold disclosed in JP-A-5-84786, the movable core 2 constitutes a cavity wall surface on the movable mold member 1 side. That is, a mold cavity 5 is composed of a cavity wall surface of each of the fixed mold member 6 and the movable core 2. The pressure caused by a molten resin injected into the cavity is exerted on the fixed mold member 6 and the movable core 2. It is therefore necessary to apply pressure to the movable core 2 with the movable core movement mechanism 4 so that the movable core 2 can withstand the above pressure. It is therefore necessary to constitute the movable core movement mechanism 4 of a drive block 11 and a following block 8 or of a drive screw 25. As a result, there is a problem in that the structure of movable core movement mechanism 4 is complicated and that the production of the mold apparatus requires an additional cost. Further, when the movable core movement mechanism 4 is composed of a fluid cylinder, it is required to press a molten resin on a cavity wall surface at a high pressure as described previously. For allowing the fluid cylinder to generate the resistant force which can withstand this pressure, there is another problem in that it is required to increase the capacity of the fluid cylinder. JP-A-5-84786 describes that the mold opening and closing mechanism is connected to a support frame 3 fixed to the movable mold member 1, while nothing specific is described concerning the so-described mold opening and closing mechanism. Further, the mold disclosed in JP-A-5-84786 has no structure in which the movable core 2 is moved with the mold opening and closing mechanism.

OBJECT AND SUMMARY OF THE INVENTION

It is therefore an object of the present invention to provide a mold apparatus which can achieve an improvement in the imprintability of a cavity wall surface to an injection-molded article surface and has a simple structure, which can be used for producing an injection-molded article having a high hollowness and an excellent appearance.

It is another object of the present invention to provide a mold apparatus, which permits the application of a high pressure to a molten resin injected into a cavity of a mold and has a simple structure, which improves the reliability of the intimate contact of an intermediate mold member to a fixed mold member or a movable mold member, which permits the easy releasing of an injection-molded article from the mold and which can decrease the occurrence of damage to the mold, so that the molding stability can be improved.

It is further another object of the present invention to provide a method of producing a hollow-structured injection-molded article having an excellent design and high functions and having a high hollowness (hollow space percentage), in which the above mold apparatus, and the introduction of a pressurized fluid into a molten resin injected in a cavity of a mold and the expansion of the volume of the cavity during the molding are utilized in combination.

The above objects of the present invention are achieved by an injection-molding method directed to a first aspect of the present invention, which uses an injection molding machine having a mold apparatus comprising (A) a fixed mold member,
(B) a movable mold member movable in the mold opening and closing directions,
(C) an intermediate mold member which is provided between the fixed mold member and the movable mold member and is slidable in the mold opening and closing directions between the fixed mold member and the movable mold member, and
(D) at least one intermediate mold member sliding means for sliding the intermediate mold member in the mold opening and closing directions, the method including the steps of injecting a molten resin into a cavity formed of cavity wall surfaces of the fixed mold member, the intermediate mold member and the movable mold member, and increasing the distance of the cavity by moving the movable mold member in the mold opening direction with keeping the intermediate mold member in intimate contact with the fixed mold member or the movable mold member by the intermediate mold member sliding means, and introducing a pressurized fluid into the molten resin in the cavity, thereby to form a hollow structure in the resin.

The injection molding method directed to the first aspect of the present invention can include an embodiment in which a pressure in the mold closing direction is applied to the molten resin in the cavity by moving the movable mold member in the mold closing direction with keeping the intermediate mold member in intimate contact with the fixed mold member or the movable mold member by the intermediate mold member sliding means while or after the molten resin is injected into the cavity, and then, the distance of the cavity is increased by moving the movable mold member in the mold opening direction while or at the point of time when the pressurized fluid is introduced into the molten resin in the cavity. For convenience, the pressure which is applied to the molten resin in the cavity in the mold closing direction by means of the movable mold member is referred to as "compressive force" hereinafter. The compressive force is applied to the molten resin in the cavity as described above, whereby the imprintability of the cavity wall surface to the resin can be improved.

In the injection molding method directed to the first aspect of the present invention, preferably, the injection molding machine has (a) a movable platen to which the movable mold member is attached, and (b) a movable platen moving means to which the movable platen is attached, for moving the movable platen, and the movable mold member is moved by actuating the movable platen moving means.

In one preferred embodiment of the injection molding method directed to the first aspect of the present invention, the distance of the cavity is increased by moving the movable mold member in the mold opening direction with keeping the intermediate mold member in intimate contact with the fixed mold member by the intermediate mold member sliding means, the mold is opened after the resin is cooled and solidified in the cavity, and the intermediate mold member is energized to the movable mold member side by the intermediate mold member sliding means while or after the mold is opened.

In another preferred embodiment of the injection molding method directed to the first aspect of the present invention, the distance of the cavity is increased by moving the movable mold member in the mold opening direction with keeping the intermediate mold member in intimate contact with the movable mold member by the intermediate mold member sliding means, the resin is cooled and solidified in the cavity, and then, the intermediate mold member is energized to the fixed mold member side by the intermediate mold member sliding means before or while the mold is opened.

In one preferred embodiment or another preferred embodiment of the injection molding method directed to the first aspect of the present invention, it is preferred to bring the intermediate mold member into intimate contact with the fixed mold member and the movable mold member when the mold is clamped. Alternatively, it is preferred to bring the intermediate mold member into intimate contact with the movable mold member or the fixed mold member by energizing the intermediate mold member with the intermediate mold member sliding means when the mold is clamped.

In the injection molding method directed to the first aspect of the present invention, the intermediate mold member sliding means may be constituted of a spring provided between the intermediate mold member and the fixed mold member or between the intermediate mold member and the movable mold member.

In one preferred embodiment of the injection molding method directed to the first aspect of the present invention above, preferably, the intermediate mold member sliding means is constituted of a fluid cylinder, the fluid cylinder is provided in the movable mold member, and the output rod of the fluid cylinder is connected to the intermediate mold member. In another preferred embodiment of the injection molding method directed to the first aspect of the present invention above, preferably, the intermediate mold member sliding means is constituted of a fluid cylinder, the fluid cylinder is provided in the fixed mold member, and the output rod of the fluid cylinder is connected to the intermediate mold member.

The above objects of the present invention are achieved by an injection-molding method directed to a second aspect of the present invention, which uses an injection molding machine having a mold apparatus comprising (A) a fixed mold member, (B) a movable mold member movable in the mold opening and closing directions, (C) an intermediate mold member which is provided between the fixed mold member and the movable mold member and is slidable in the mold opening and closing directions between the fixed mold member and the movable mold member, and (D) at least one intermediate mold member fixing means for fixing the intermediate mold member to the fixed mold member or the movable mold member, the injection molding machine having (a) a movable platen to which the movable mold member is attached, and (b) a movable platen moving means to which the movable platen is attached, for moving the movable platen, the method including the steps of injecting a molten resin into a cavity formed of cavity wall surfaces of the fixed mold member, the intermediate mold member and the movable mold member, and increasing the distance of the cavity by moving the movable mold member in the mold opening direction with actuating the movable platen moving means with keeping the intermediate mold member in intimate contact with the fixed mold member or the movable mold member, and introducing a pressurized fluid into the molten resin in the cavity, thereby to form a hollow structure in the resin.

In one preferred embodiment of the injection molding method directed to the second aspect of the present invention, a pressure (a compressive force) in the mold closing direction is applied to the molten resin in the cavity with the movable mold member by moving the movable mold member in the mold closing direction with actuating the movable platen moving means with keeping the intermediate mold member in intimate contact with the fixed mold member or the movable mold member while or after the molten resin is injected into the cavity, and then, the distance of the cavity is increased by moving the movable mold member in the mold opening direction with actuating the movable platen moving means while or at the point of time when the pressurized fluid is introduced into the molten resin in the cavity.

In the injection molding method directed to the second aspect of the present invention, preferably, the intermediate mold member fixing means is constituted of a clamp mechanism provided in the intermediate mold member and the fixed mold member or in the intermediate mold member and the movable mold member. In this case, the clamp mechanism is selected from a latch with a spring and a fluid clamp.

In the injection molding method directed to the first or second aspect of the present invention, the molten resin is injected into the cavity in such an amount that the cavity is completely filled or that the cavity is incompletely filled. In any case, the molten resin is injected in an amount sufficient for producing an intended molded article. For improving the imprintability of the cavity wall surface to an injection-molded article surface, preferably, a necessary amount of the molten resin is injected into the cavity and then a dwell pressure is applied to the molten resin in the cavity.

The above objects of the present invention are achieved by a mold apparatus directed to the first aspect of the present invention for use with an injection molding machine for producing a hollow-structured injection-molded article by injecting a molten resin into a cavity, increasing the distance of the cavity in the mold opening direction and introducing a pressurized fluid into the molten resin in the cavity, thereby to form a hollow structure in the resin, the mold apparatus comprising (A) a fixed mold member,
(B) a movable mold member movable in the mold opening and closing directions,
(C) an intermediate mold member which is provided between the fixed mold member and the movable mold member and is slidable in the mold opening and closing directions between the fixed mold member and the movable mold member, and
(D) at least one intermediate mold member sliding means for sliding the intermediate mold member in the mold opening and closing directions, wherein the cavity is formed of cavity wall surfaces of the fixed mold member, the intermediate mold member and the movable mold member.

In the mold apparatus directed to the first aspect of the present invention, preferably, the above movable mold member is attached to a movable platen provided in the injection molding machine, the movable platen is attached to a movable platen moving means provided in the injection molding machine, and the movable mold member is moved by actuating the movable platen moving means.

In one preferred embodiment of the mold apparatus directed to the first aspect of the present invention, the distance of the cavity can be increased by moving the movable mold member in the mold opening direction with keeping the intermediate mold member in intimate contact with the fixed mold member by the intermediate mold member sliding means. In the mold apparatus of this embodiment, preferably, the intermediate mold member can be energized to the movable mold member side by the intermediate mold member sliding means while or after the mold is opened.

In another preferred embodiment of the mold apparatus directed to the first aspect of the present invention, the distance of the cavity can be increased by moving the movable mold member in the mold opening direction with keeping the intermediate mold member in intimate contact with the movable mold member by the intermediate mold member sliding means. In the mold apparatus of this embodiment, preferably, the intermediate mold member can be energized to the fixed mold member side by the intermediate mold member sliding means before or while the mold is opened.

In one preferred embodiment or another preferred embodiment of the mold apparatus directed to the first aspect of the present invention, preferably, when the mold is clamped, it is preferred to bring the intermediate mold member into intimate contact with the fixed mold member and the movable mold member. Alternatively, when the mold is clamped, it is preferred to bring the intermediate mold member into intimate contact with the movable mold member or the fixed mold member by energizing the intermediate mold member with the intermediate mold member sliding means.

In the mold apparatus directed to the first aspect of the present invention, the intermediate mold member sliding means can be constituted of a spring provided between the intermediate mold member and the fixed mold member or between the intermediate mold member and the movable mold member. In this case, the spring is selected from those which have a pressing force equivalent to, or higher than, a resin pressure exerted on the cavity wall surface in the mold opening direction, and which can keep the intermediate mold member in intimate contact with the fixed mold member or the movable mold member when the distance of the cavity is increased by moving the movable mold member in the mold opening direction.

In one preferred embodiment of the mold apparatus directed to the first aspect of the present invention above, preferably, the intermediate mold member sliding means is constituted of a fluid cylinder, the fluid cylinder is provided in the movable mold member, and the output rod of the fluid cylinder is connected to the intermediate mold member. In another preferred embodiment of the mold apparatus directed to the first aspect of the present invention above, preferably, the intermediate mold member sliding means is constituted of a fluid cylinder, the fluid cylinder is provided in the fixed mold member, and the output rod of the fluid cylinder is connected to the intermediate mold member.

When a fluid cylinder is used as the intermediate mold member sliding means, a hydraulic cylinder is preferred. When a hydraulic cylinder is used, a hydraulic power source is available from the injection molding machine, while a separate hydraulic unit may be used. When the force for pressing the intermediate mold member to the fixed mold member or the movable mold member can be small due to the shape of a molded article, kind of a resin used, molding conditions and the like, an air cylinder may be used as the fluid cylinder. In the present invention, the use of a direct-acting fluid cylinder is considered economical in view of the availability of parts and the assembly and constitution of the mold, while a cam mechanism may be used in combination with the fluid cylinder, or a rotary fluid cylinder may be used, in the mold apparatus having some structure.

The above objects of the present inventions are achieved by a mold apparatus directed to the second aspect of the present invention for use with an injection molding machine for producing a hollow-structured injection-molded article by injecting a molten resin into a cavity, increasing the distance of the cavity in the mold opening direction and introducing a pressurized fluid into the molten resin in the cavity, thereby to form a hollow structure in the resin, the mold apparatus comprising (A) a fixed mold member,
(B) a movable mold member movable in the mold opening and closing directions, (C) an intermediate mold member which is provided between the fixed mold member and the movable mold member and is slidable in the mold opening and closing directions between the fixed mold member and the movable mold member, and (D) at least one intermediate mold member fixing means for fixing the intermediate mold member to the fixed mold member or the movable mold member, wherein the cavity is formed of cavity wall surfaces of the fixed mold member, the intermediate mold member and the movable mold member, and the movable mold member is attached to a movable platen provided in the injection molding machine, the movable platen is attached to a movable platen moving means provided in the injection molding machine, and the movable mold member is movable by actuating the movable platen moving means.

In the mold apparatus directed to the second aspect of the present invention, preferably, the intermediate mold member fixing means is constituted of a clamp mechanism provided in the intermediate mold member and the fixed mold member or in the intermediate mold member and the movable mold member. In this case, the clamp mechanism is selected from a latch with a spring and a fluid clamp.

In the mold apparatus of the present invention or the injection molding method of the present invention, a portion for injecting a molten resin into the cavity and a portion for introducing a pressurized fluid may be provided in a same site in the mold or in different sites in the mold. The number of the molten resin injection portion and the number of the pressurized fluid introduction portion may be determined as required.

The resin used in the injection molding method of the present invention is not specially limited, and it can be selected from thermoplastic resins, alloys of thermoplastic resin elastomers and thermosetting resins. Examples of the resins include not only so-called general-use plastics such as a polyolefin resin, a polystyrene resin, an ABS resin, an AS resin, a PVC resin, a methacrylic resin and a fluorine-containing resin, but also engineering plastics such as a nylon resin, a saturated polyester resin, a polycarbonate resin, a polyacrylate resin, a polyacetal resin, a polysulfone resin and a modified polyphenylene ether resin. The resin used in the present invention may contain reinforcement fibers, a filler and a stabilizer as required.

In working the injection molding method of the present invention, the injection molding conditions such as the amount, temperature, pressure and injection rate of the molten resin, the amount, pressure and injection rate of the pressurized fluid, and the cooling rate of the mold, are required to be properly selected or controlled depending upon the kind of the resin used, the form and structure of the mold and the like, and these conditions are therefore not uniquely determined.

The fluid for the pressurized fluid can be selected from substances which are in a gaseous state at room temperature such as nitrogen gas, carbon dioxide gas, air and helium gas and substances which are in a liquid state at room temperature such as water. Further, a gas which is liquefied under high pressure may be also used, while it is most preferred to use an inert gas such as nitrogen gas or helium gas. Further, a foaming resin or a fiber-reinforced resin material may be used as a pressurized fluid. In this case, a portion of the hollow structure is filled with the foaming resin or fiber-reinforced resin material, and this structure is also included in the hollow structure in the present invention.

In the present invention, when the movable mold member is moved in the mold opening and closing directions, the movement of the movable platen is more effectively controlled by the movable platen moving means having a servo mechanism in view of the occurrence of a resisting force against the injection pressure of the molten resin or the dwell pressure on the resin, the control of the compressive force on the molten resin injected in the cavity and the control of the thickness of an injection-molded article. That is, the movement stroke and movement rate of the movable mold member and the compressive force can be accurately controlled with a servo mechanism, so that an injection-molded article having high dimensional accuracy can be obtained. The movable platen moving means can be selected from a hydraulic cylinder, an electric motor and a toggle mechanism connected to a hydraulic cylinder or an electric motor.

In the present invention, the cavity is constituted of not only the cavity wall surfaces of the fixed mold member and the intermediate mold member but also the cavity wall surface of the movable mold member. It is therefore generally sufficient to apply to the movable mold member alone a force with which the pressure caused by the molten resin injected in the cavity can be withstood. Unlike the mold disclosed in JP-A-5-84786 in which the movable core is provided with force so that it can withstand the pressure caused by the molten resin injected into the cavity, it is therefore not necessary to increase the capacity of the fluid cylinder. Further, since, for expanding the volume of the cavity, the distance of the cavity is increased by moving the movable mold member in the mold opening direction with keeping the intermediate mold member in intimate contact with the fixed mold member or the movable mold member, the leakage of molten resin Out of the cavity can be reliably prevented.

In prior art, an injection molding machine is also provided with a movable platen and a movable platen moving means is attached to the movable platen, and the movable mold member is attached to the movable platen. By actuating the movable platen moving means, the mold is clamped, the resisting force against the pressure of the injected molten resin and the dwell pressure on the resin are generated, and the mold is opened. However, as far as the prior art a movable platen moving means which the present inventors have studied are concerned, a movable platen moving means is not used for the purpose of producing a hollow-structured injection-molded article having an excellent design and high functions and internally having a high hollowness.

On the other hand, in the present invention, even if the movement of the movable mold member in the mold opening direction is associated with the movable platen, the cost for manufacturing the mold apparatus does not increase, nor does the mold apparatus have any complicated structure.

Further, when the fluid cylinder is used as the intermediate mold member sliding means, the force for pressing the intermediate mold member to the fixed mold member or the movable mold member to keep the intermediate mold member in intimate contact with it can be accurately set by controlling the pressure of the fluid cylinder. Furthermore, the pressing force can be easily uniformly maintained with moving the movable mold member in the mold opening direction. The pressing force can be increased by only increasing the fluid pressure of the fluid cylinder, if necessary. The pressing force can be decreased by only decreasing the fluid pressure of the fluid cylinder, if necessary. Moreover, the pressing force can be accurately controlled regardless of the position of the movable mold member, and the fluid cylinder can be decreased in capacity since the fluid cylinder is required only to generate the pressing force.

Further, when the fluid cylinder is used as the intermediate mold member sliding means, the intermediate mold member can be energized to the movable mold member side by the fluid cylinder while or after the mold is opened. As a result, an injection-molded article can be smoothly ejected from the mold with, for example, an ejection pin, since the injection-molded article is not in a state where it is in intimate contact with the intermediate mold member. Alternatively, the intermediate mold member can be energized to the fixed mold member side by the fluid cylinder before the mold is opened. As a result, when the opening of the mold is initiated, an injection-molded article no longer pulls the intermediate mold member in the mold opening direction, so that the injection-molded article can be easily taken out of the mold and the damage on the mold can be prevented. Other effects and advantages of the present invention will be apparent from the following detailed description.

BRIEF DESCRIPTION OF THE DRAWINGS

The present invention will be explained in detail with reference to drawings hereinafter.

DESCRIPTION OF THE PREFERRED EMBODIMENTS

Figure 1:
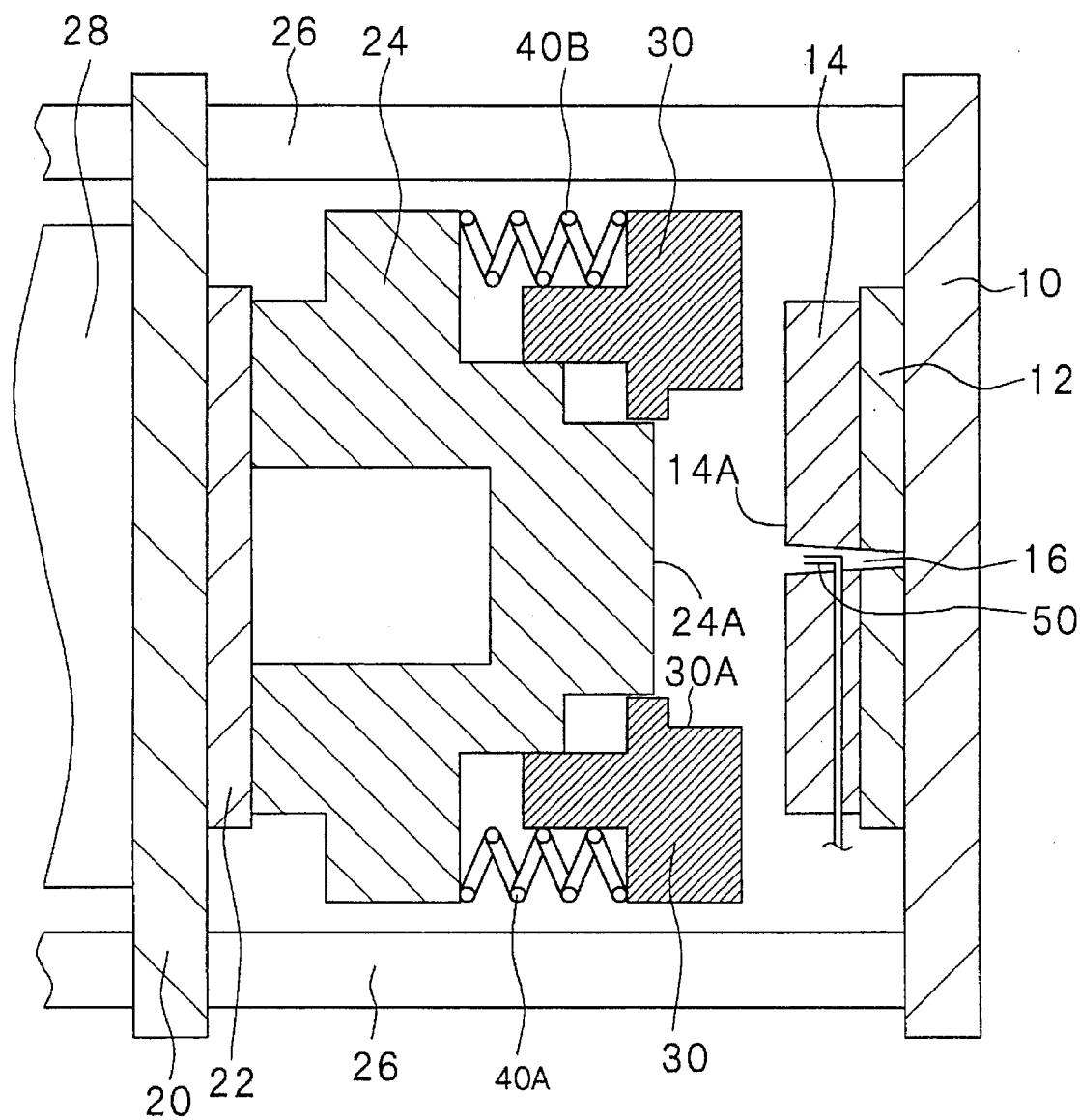
FIG. 1 is a schematic cross-sectional view of a mold apparatus used in Example 1 before the mold is clamped.

FIGS. 1 to 35 show mold apparatus directed to the first and second aspects of the present invention. The mold apparatus of the present invention is used with an injection molding machine for producing a hollow-structured injection-molded article by injecting a molten resin into a cavity 60, increasing the distance of the cavity 60 in the mold opening direction and introducing a pressurized fluid into the molten resin in the cavity 60, thereby to form a hollow structure in the resin.

The mold apparatus directed to the first and second aspects of the present invention comprises a fixed mold member 14, a movable mold member 24 movable in the mold opening and closing directions, and an intermediate mold member 30 which is provided between the fixed mold member 14 and the movable mold member 24 and is slidable in the mold opening and closing directions between the fixed mold member 14 and the movable mold member 24. The intermediate mold member 30 is disposed so as to surround a top portion of the movable mold member 24 (that part of the movable mold member 24 which constitutes a cavity wall surface 24A). Alternatively, the intermediate mold member 30 is disposed so as to surround a top portion of the fixed mold member 14 (that part of the fixed mold member 14 which constitutes a cavity wall surface 14A). The cavity 60 is formed of the cavity wall surface 14A of the fixed mold member 14, the cavity wall surface 30A of the intermediate mold member 30 and the cavity wall surface 24A of the movable mold member 24. The cavity wall surface 14A of the fixed mold member 14 is opposite to the cavity wall surface 24A of the movable mold member 24. "The distance of the cavity in the mold opening (opening and closing, closing), direction(s)" means a distance between the cavity wall surface 14A of the fixed mold member and the cavity wall surface 24A of the movable mold member 24, and a word, "distance" has the same meaning as "length", "thickness" or "depth" in some cases.

The fixed mold member 14 is attached to a fixed platen 10 through a fixed mold member attaching plate 12. The movable mold member 24 is attached to a movable platen 20 through a movable mold member attaching plate 22. The movable mold member 24 is moved in the mold opening and closing directions along a tie-bar 26 together with the movement of the movable platen 20. The movable platen 20 is attached to a movable platen moving means 28. The movable platen moving means 28 comprises, for example, a hydraulic cylinder, and is called a clamping ram in some cases. By actuating the movable platen moving means 28, not only the movable platen 20 but also the movable mold member 24 can be moved in the mold opening and closing directions. The movable mold member 24 is internally provided with an injection-mold article ejection device (not shown) having an ejection pin for taking the injection-molded article out of the mold. Further, the movable platen moving means is only partially shown in Figures.

Numeral 16 indicates a molten resin injection portion formed of a gate portion. Numerals 50 or 150 indicates a pressurized fluid introduction portion for introducing a pressurized fluid. When gas is used as a pressurized fluid, the pressurized fluid introduction portion 50 or 150 is provided with, for example, at least one non-return valve on its top and is formed as a gas injection nozzle of which the top can communicate with the cavity 60 or part from the cavity 60 by a moving mechanism (not shown). The other end of the pressurized fluid introduction portion 50 or 150 is connected to a pressurized gas source (not shown) through a tubing. Figures show main constitutions of the mold apparatus of the present invention, and the showing of a resin injection device of an injection molding machine, etc., is omitted.

In the mold apparatus of the present invention, a sprue portion and a runner portion for flowing a molten resin are provided between the top portion of a heating cylinder provided in the injection molding machine and the cavity 60, and the molten resin injection portion 16 formed of a gate portion is provided between the runner portion and the cavity 60. The runner portion may be structured as any one of a cold runner and a hot runner, and when a hot runner is used, it is effective to use a valve gate.

In the mold apparatus of the present invention, the position of the pressurized fluid introduction portion 50 or 150 is not specially limited. The pressurized fluid introduction portion 50 may be positioned in the molten resin injection portion 16 or near the molten resin injection portion 16. The pressurized fluid introduction portion 150 may be positioned apart from the molten resin injection portion 16. Further, the number of the pressurized fluid introduction portions 50 or 150 is not specially limited. A plurality of pressurized fluid introduction portions are provided, there can be produced an injection-molded article internally having partition wall(s) of the resin, and the injection-molded article can internally have a plurality of hollow structures such as fluid paths.

The mold apparatus of the present invention can be produced as one for giving one injection-molded article or as one for giving a plurality of injection-molded articles.

The mold apparatus in the first to sixth embodiments of the present invention will be explained hereinafter. The mold apparatus in the first to fourth embodiments of the present invention are directed to the mold apparatus directed to the first aspect of the present invention, and have at least one intermediate mold member sliding means for sliding the intermediate mold member 30 in the mold opening and closing directions. The mold apparatus in the fifth and sixth embodiments of the present invention are directed to the mold apparatus directed to the second aspect of the present invention, and have at least one intermediate mold member fixing means for fixing the intermediate mold member to the fixed mold member or the movable mold member.

Figure 2:
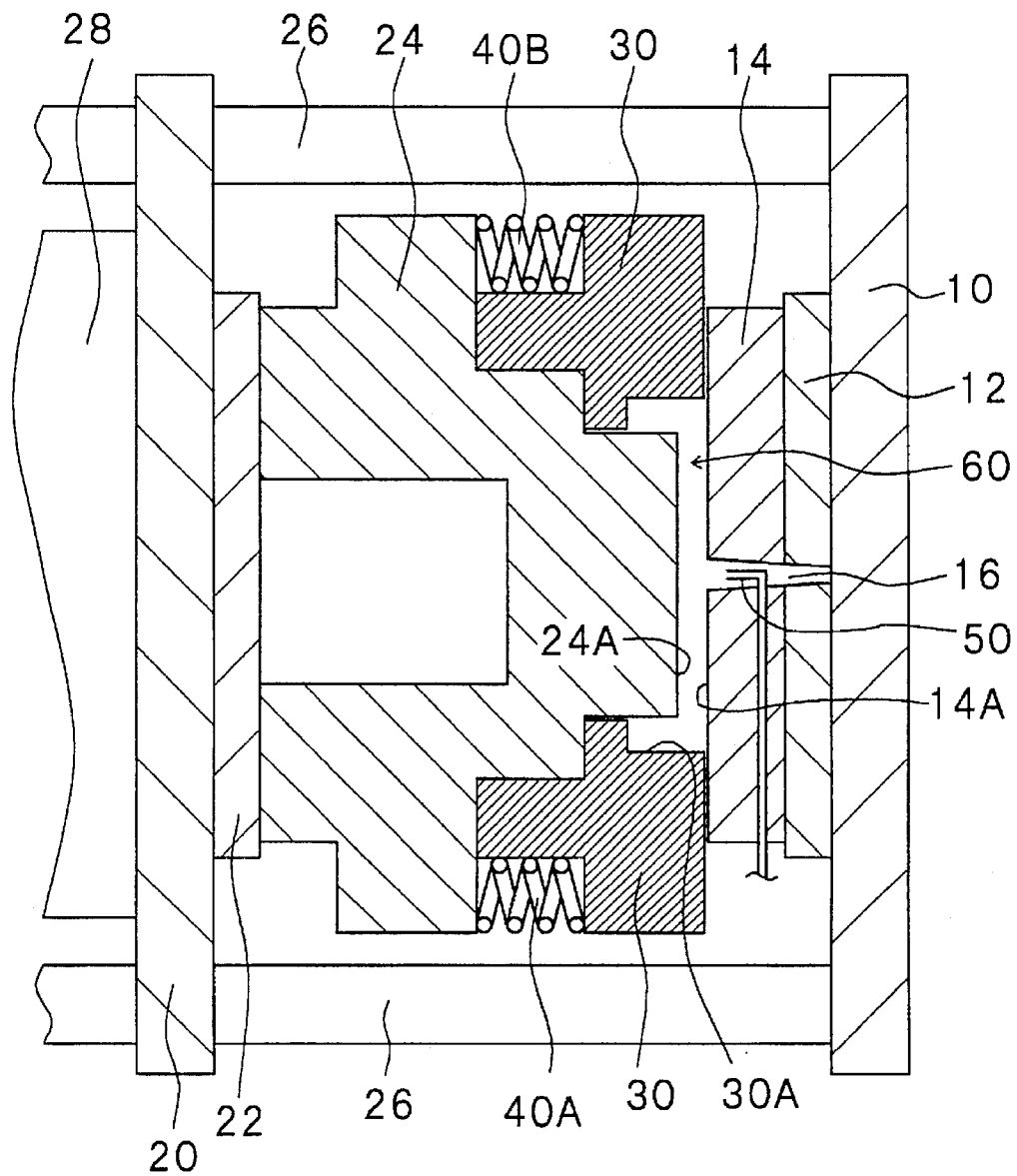
FIG. 2 is a schematic cross-sectional view of a mold apparatus used in Example 1 after the mold is clamped.
Figure 3:
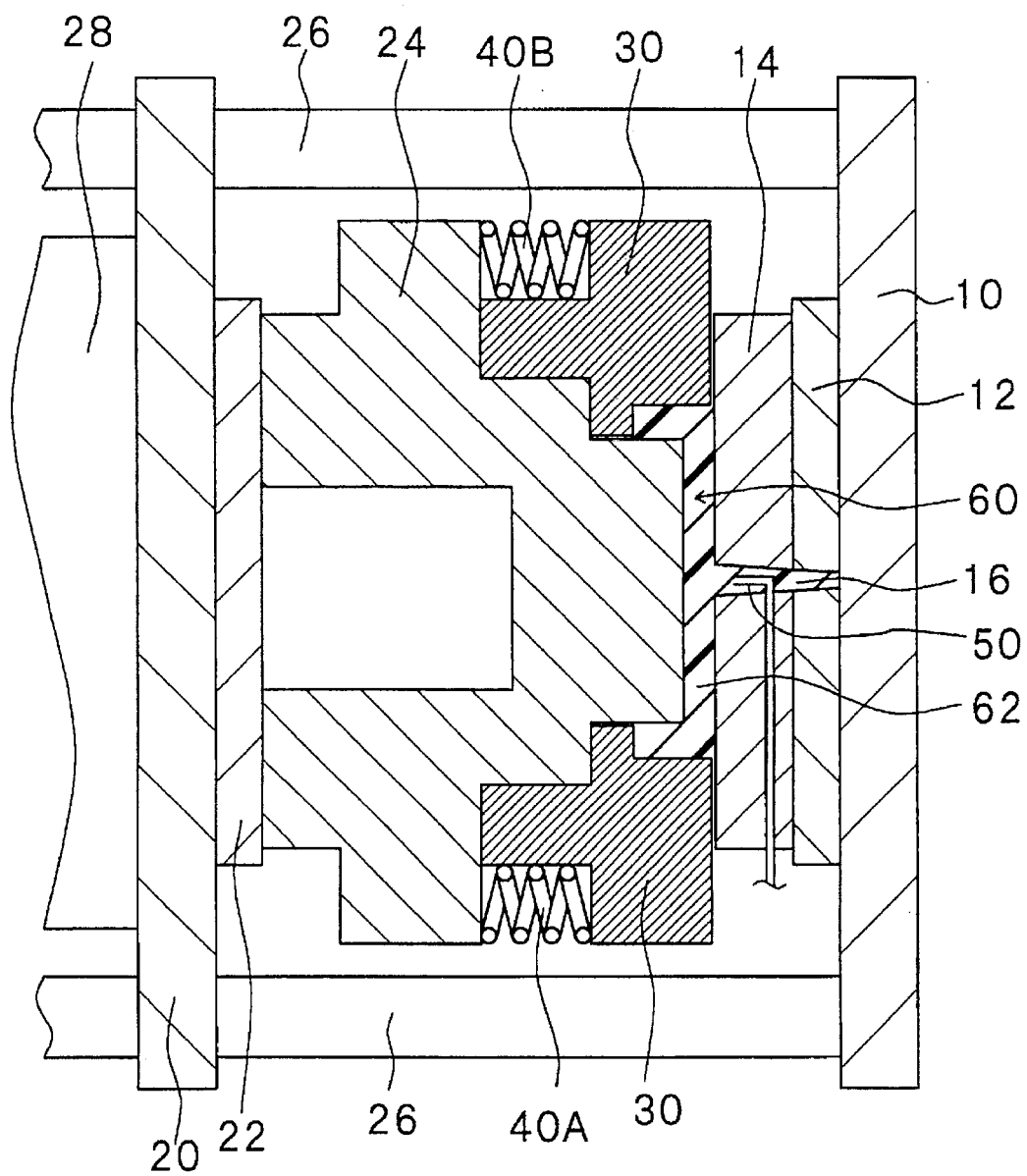
FIG. 3 is a schematic cross-sectional view of a mold apparatus used in Example 1 after the injection of a molten resin is initiated.
Figure 4:
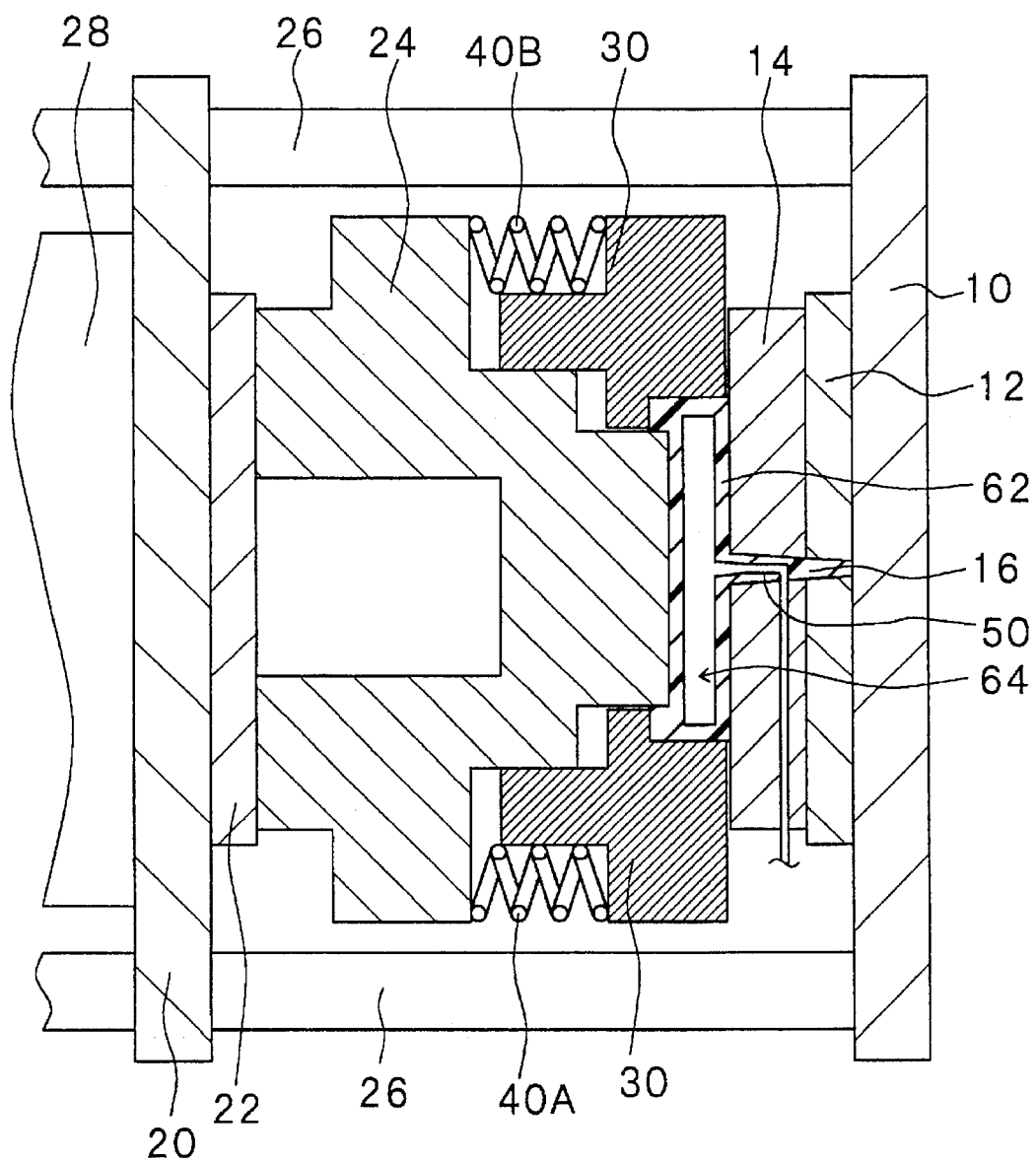
FIG. 4 is a schematic cross-sectional view of a mold apparatus used in Example I after the introduction of a pressurized fluid is initiated and after the movement of a movable mold member is initiated.
Figure 5:
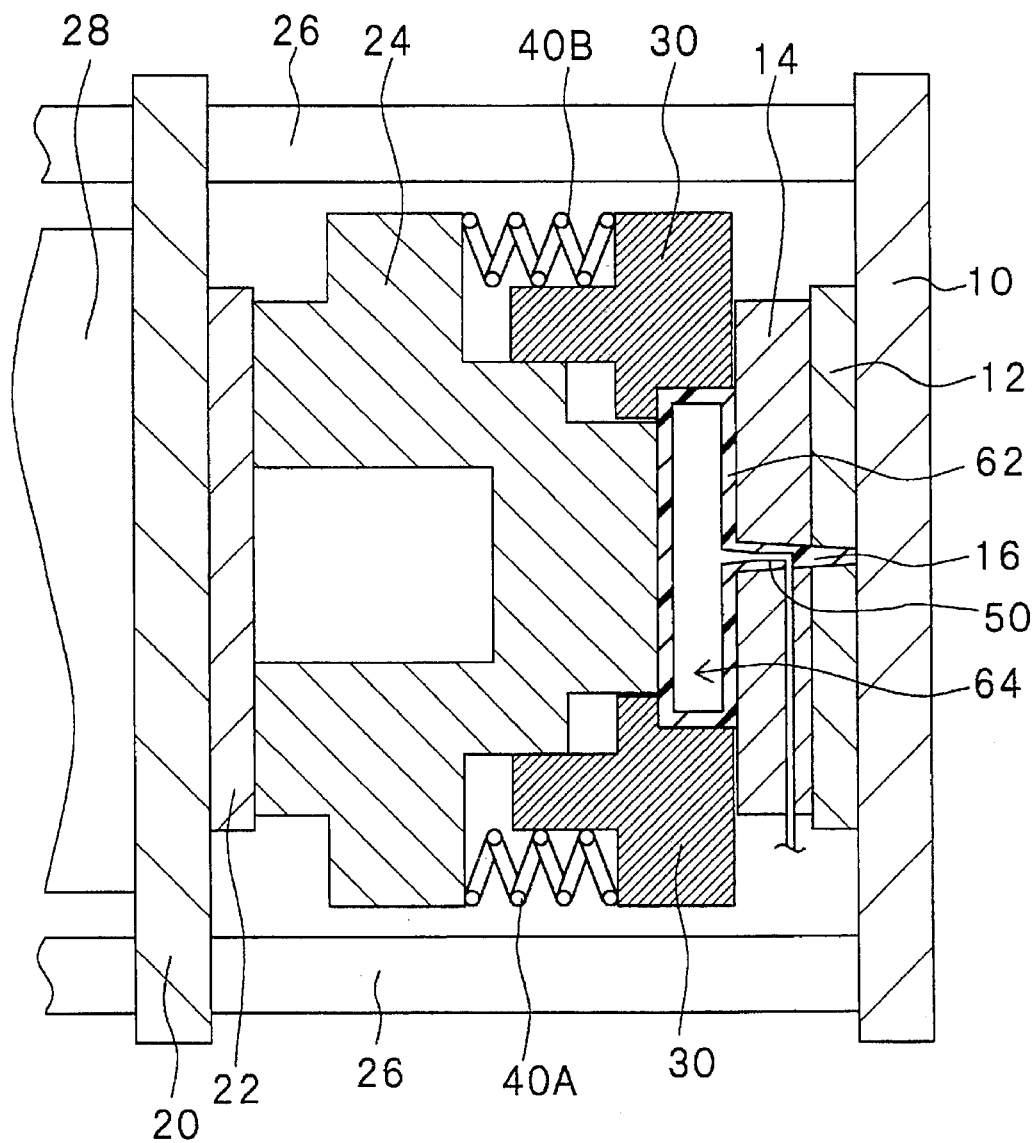
FIG. 5 is a schematic cross-sectional view of a mold apparatus used in Example 1 after the introduction of a pressurized fluid is initiated and after the movement of a movable mold member is finished.

In the mold apparatus as the first embodiment of the present invention as shown in FIGS. 1 to 6, intermediate mold member sliding means 40A and 40B are formed of four springs attached to the movable mold member 24. FIGS. 1 to 6 show two of them as numerals 40A and 40B. As shown in FIGS. 3 to 5, the movable platen moving means 28 is actuated to move the movable mold member 24 in the mold opening direction with keeping the intermediate mold member 30 in intimate contact with the fixed mold member 14 by the intermediate mold member sliding means 40A and 40B, so that the distance of the cavity 60 in the mold opening direction can be increased for expanding the volume of the cavity 60. Further, as shown in FIG. 2, when the mold is clamped by actuating the movable platen moving means 28, the intermediate mold member 30 is brought into intimate contact with the fixed mold member 14 and the movable mold member 24. The intermediate mold member 30 is positioned so as to surround the top portion of the movable mold member 24 (that part of the movable mold member 24 which constitutes a cavity wall surface 24A).

Figure 7:
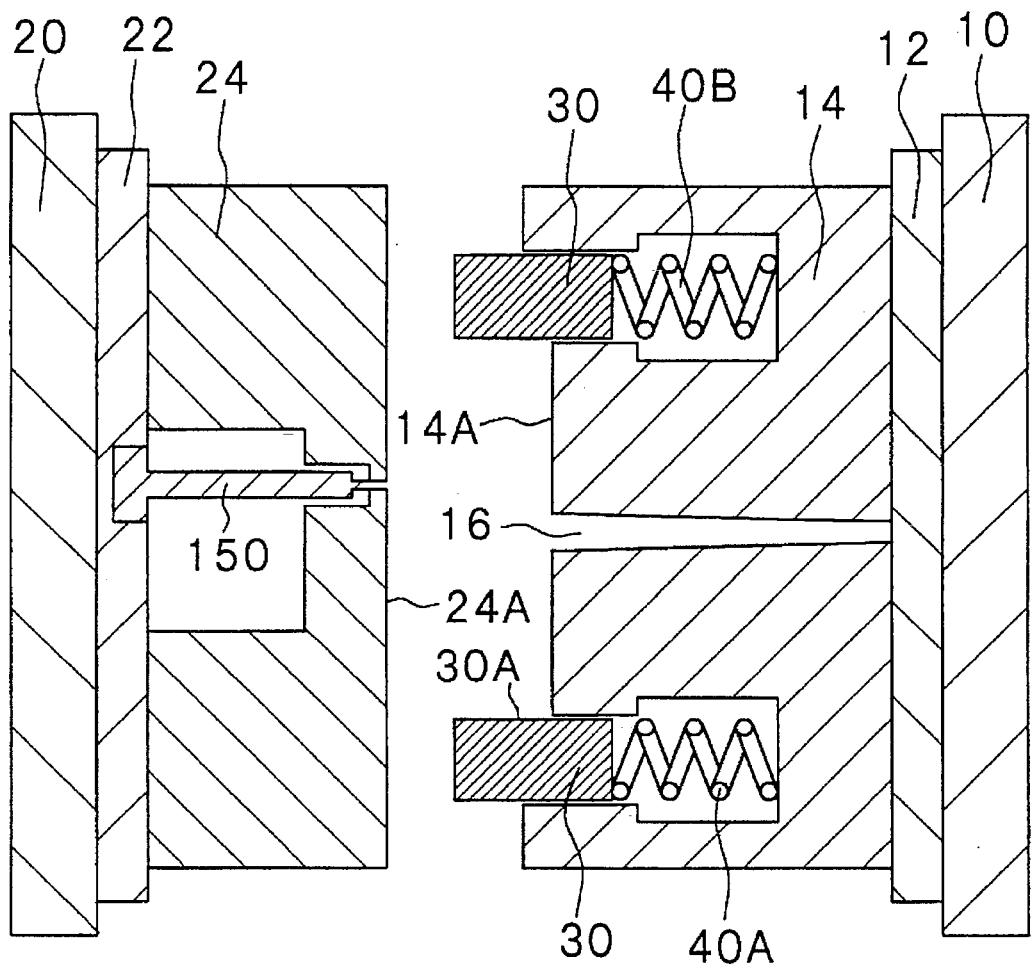
FIG. 7 is a schematic cross-sectional view of a mold apparatus used in Example 3 before the mold is clamped.
Figure 8:
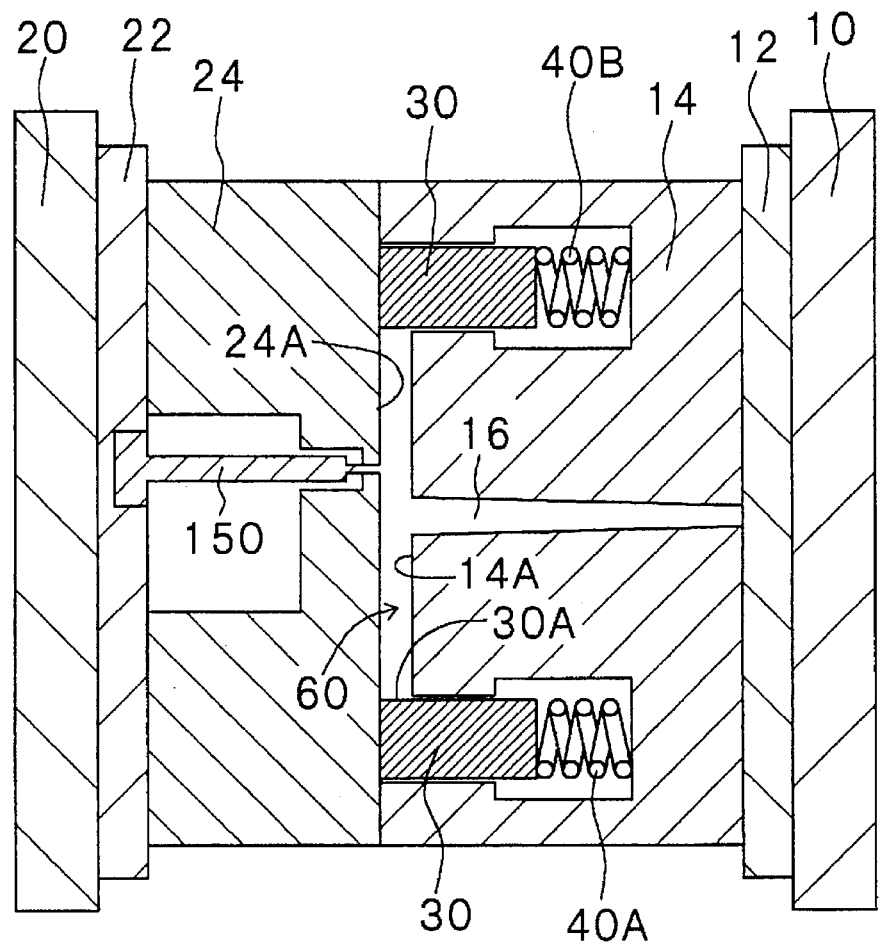
FIG. 8 is a schematic cross-sectional view of a mold apparatus used in Example 3 after the mold is clamped.
Figure 9:
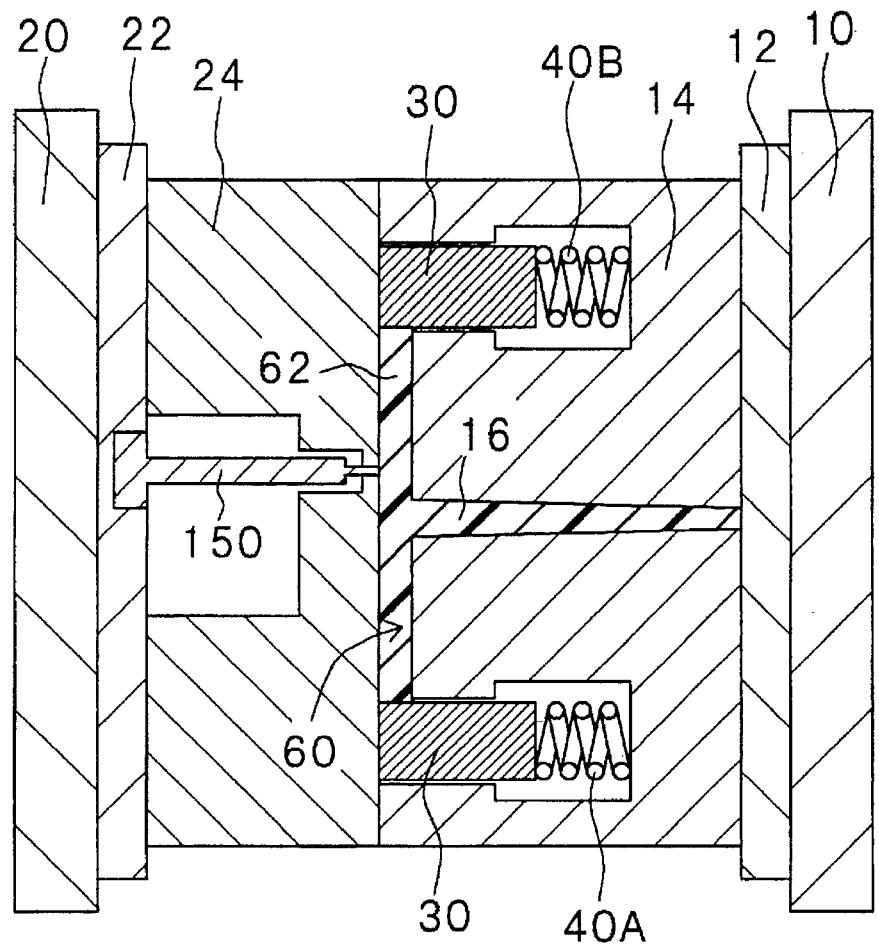
FIG. 9 is a schematic cross-sectional view of a mold apparatus used in Example 3 after the injection of a molten resin is initiated.
Figure 10:
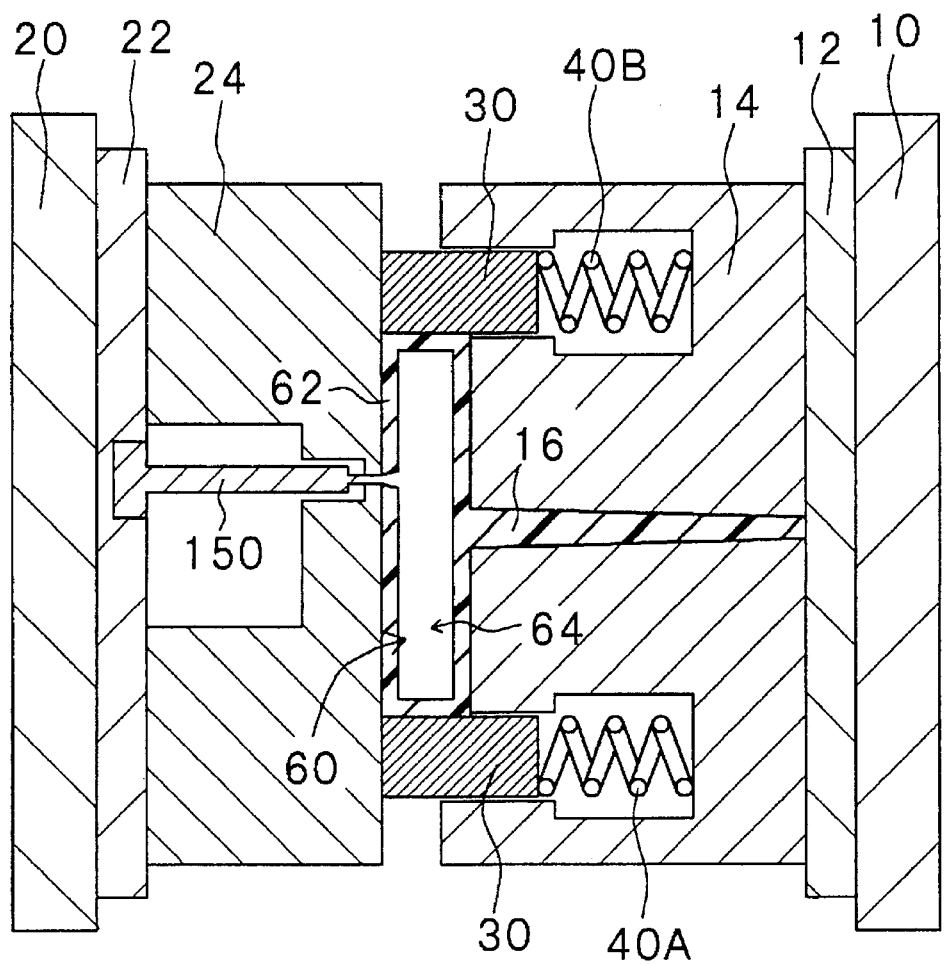
FIG. 10 is a schematic cross-sectional view of a mold apparatus used in Example 3 after the introduction of a pressurized fluid is initiated and after the movement of a movable mold member is finished.

In the mold apparatus as the second embodiment of the present invention as shown in FIGS. 7 to 11, unlike the mold apparatus in the first embodiment, intermediate mold member sliding means are formed of four springs attached to the fixed mold member 14. FIGS. 7 to 11 show two of them as numerals 40A and 40B. As shown in FIGS. 9 and 10, the movable platen moving means is actuated to move the movable mold member 24 in the mold opening direction with keeping the intermediate mold member 30 in intimate contact with the movable mold member 24 by the intermediate mold member sliding means 40A and 40B, so that the distance of the cavity 60 in the mold opening direction can be increased for expanding the volume of the cavity 60. As shown in FIG. 8, when the mold is clamped by actuating the movable platen moving means, the intermediate mold member 30 is energized by the intermediate mold member sliding means 40A and 40B to be brought into intimate contact with the movable mold member 24. The intermediate mold member 30 is provided so as to surround the top portion of the fixed mold member 14 (that part of the fixed mold member 14 which constitutes a cavity wall surface 14A). FIGS. 7 to 35 omit the showing of the tie-bar 26 and the movable platen moving means 28.

Figure 12:
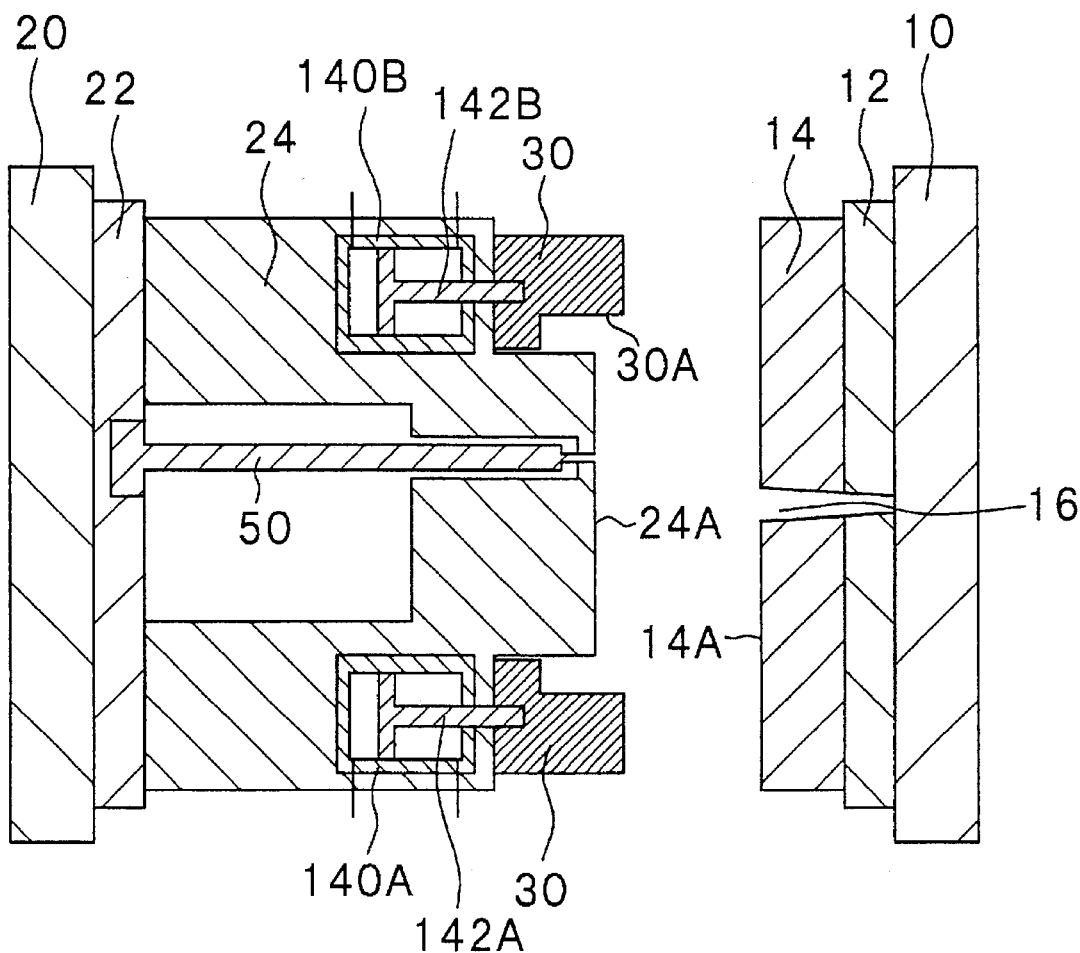
FIG. 12 is a schematic cross-sectional view of a mold apparatus used in Example 4 before a mold is clamped.
Figure 13:
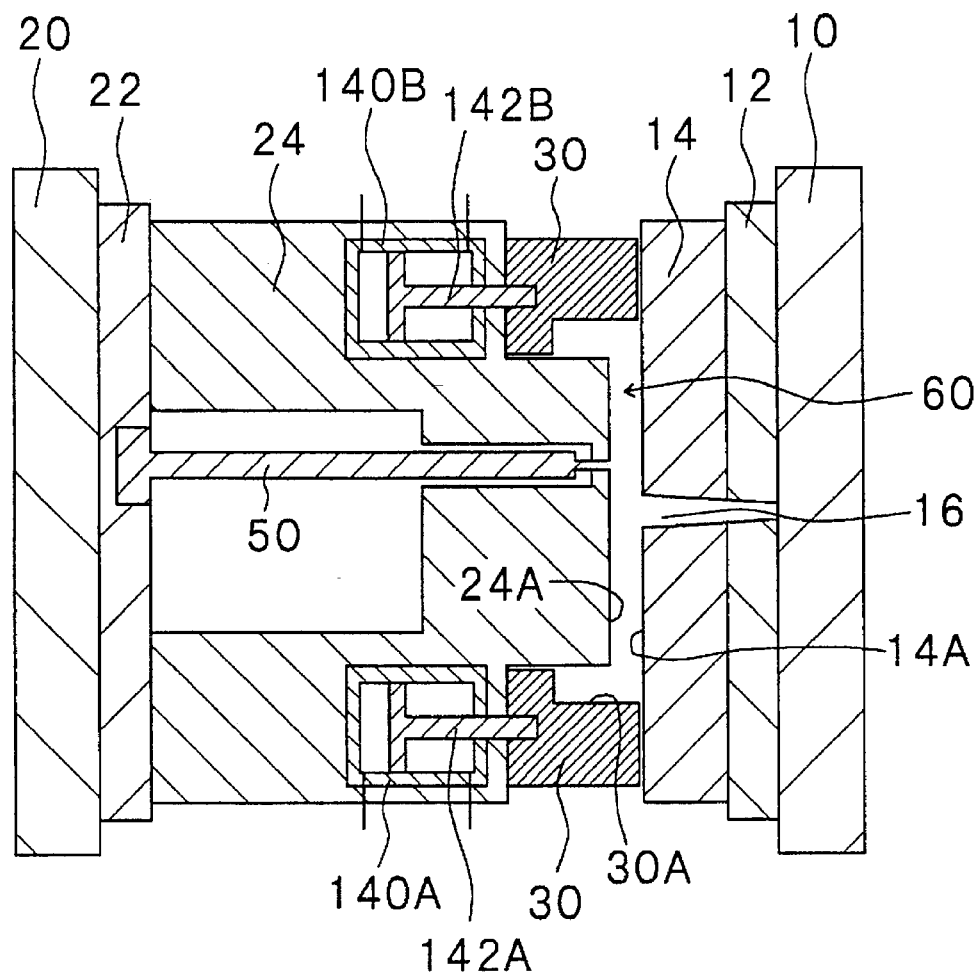
FIG. 13 is a schematic cross-sectional view of a mold apparatus used in Example 4 after a mold is clamped.
Figure 14:
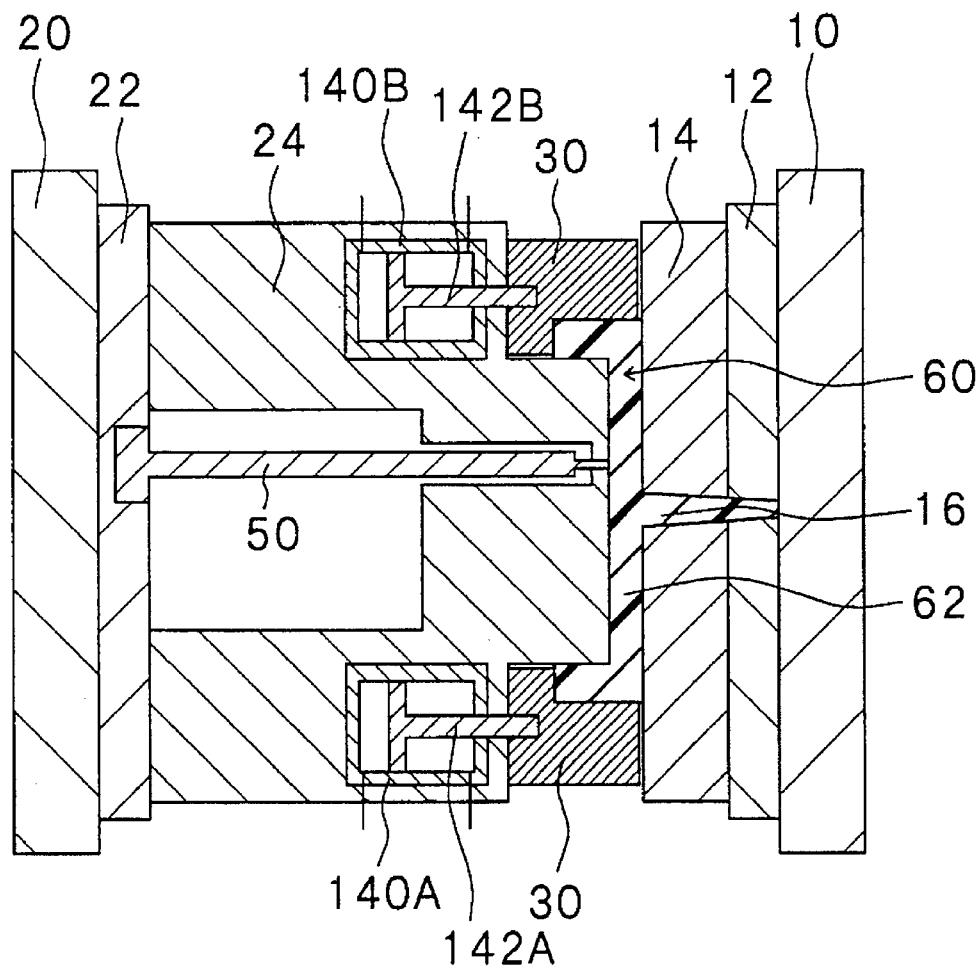
FIG. 14 is a schematic cross-sectional view of a mold apparatus used in Example 4 after the injection of a molten resin is initiated.
Figure 15:
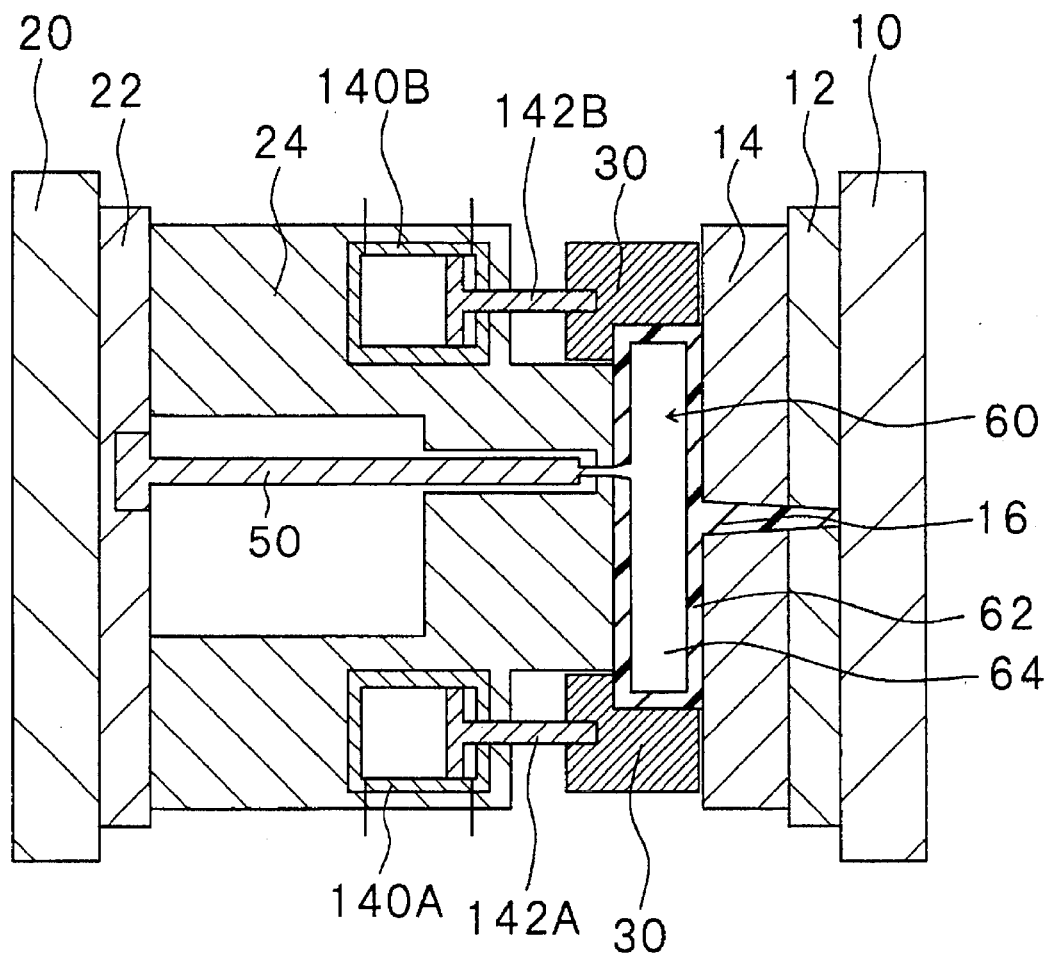
FIG. 15 is a schematic cross-sectional view of a mold apparatus used in Example 4 after the introduction of a pressurized fluid is initiated and after the movement of a movable mold member is finished.
Figure 16:
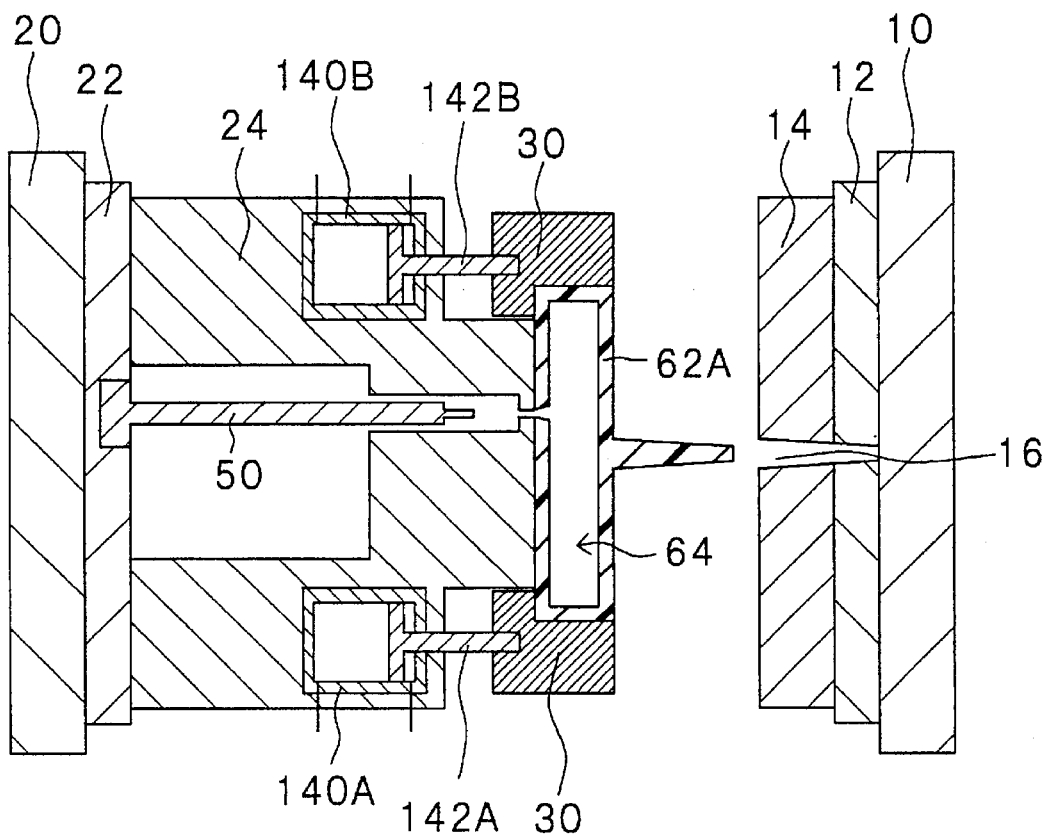
FIG. 16 is a schematic cross-sectional view of a mold apparatus used in Example 4 after a mold is opened.
Figure 17:
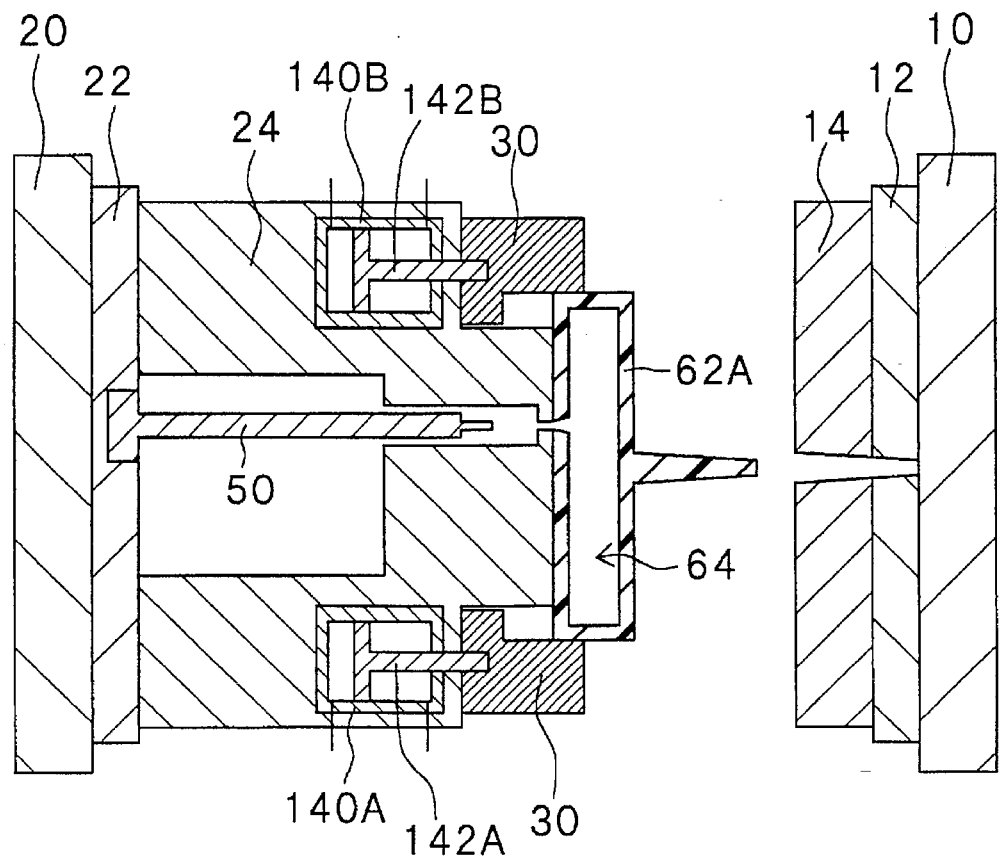
FIG. 17 is a schematic cross-sectional view of a mold apparatus used in Example 4 after a mold is opened and after an intermediate mold member is moved.

In the mold apparatus as the third embodiment of the present invention as shown in FIGS. 12 to 17, intermediate mold member sliding means is formed of at least one fluid cylinder (two fluid cylinders 140A and 140B are shown in FIGS. 12 to 17). The fluid cylinder 140A and 140B are attached to the movable mold member 24, and the output rods 142A and 142B of the fluid cylinders 140A and 140B are connected to the intermediate mold member 30. Each of the fluid cylinders 140A and 140B is formed of, for example, a hydraulic cylinder. The intermediate mold member 30 is energized to the fixed mold member 14 side by actuating the fluid cylinders 140A and 140B, so that the intermediate mold member 30 can be brought into intimate contact with the fixed mold member 14. Further, the intermediate mold member 30 can be energized to the movable mold member 24 side by reversibly actuating the fluid cylinder 140A and 140B, so that the intermediate mold member 30 can be pulled back. That is, as shown in FIGS. 16 and 17, while or after the mold is opened by actuating the movable platen moving means, the intermediate mold member 30 can be energized to the movable mold member 24 side by the fluid cylinders 140A and 140B. As shown in FIGS. 14 and 15, the movable mold member 24 is moved in the mold opening direction by actuating the movable platen moving means with keeping the intermediate mold member 30 in intimate contact with the fixed mold member 14 by the fluid cylinders 140A and 140B, so that the distance of the cavity 60 in the mold opening direction can be increased for expanding the volume of the cavity 60. The intermediate mold member 30 is provided so as to surround the top portion of the movable mold member 24 (that part of the movable mold member 24 which constitutes a cavity wall surface 24A).

As shown in FIG. 13, the intermediate mold member 30 is structured so as to be brought into intimate contact with the fixed mold member 14 and the movable mold member 24, when the mold is clamped by actuating the movable platen moving means. In this structure, the clamping force is transmitted from the movable mold member 24 to the fixed mold member 14 through the intermediate mold member 30, and it is therefore no longer necessary to allow the fluid cylinders 140A and 140B connected to the intermediate mold member 30 to clamp the mold. As a result, the fluid cylinders 140A and 140B can be decreased in capacity.

Figure 19:
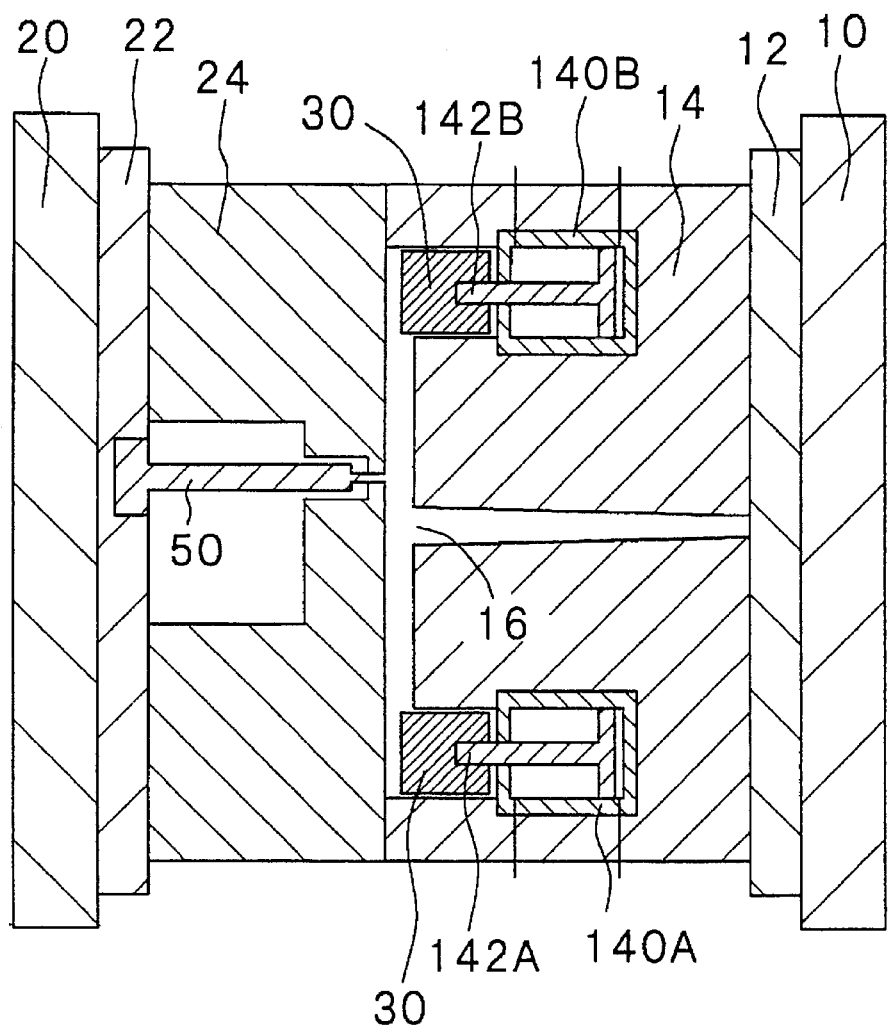
FIG. 19 is a schematic cross-sectional view of a mold apparatus used in Example 5 after a mold is clamped and before an intermediate mold member is brought into intimate contact with a movable mold member.
Figure 20:
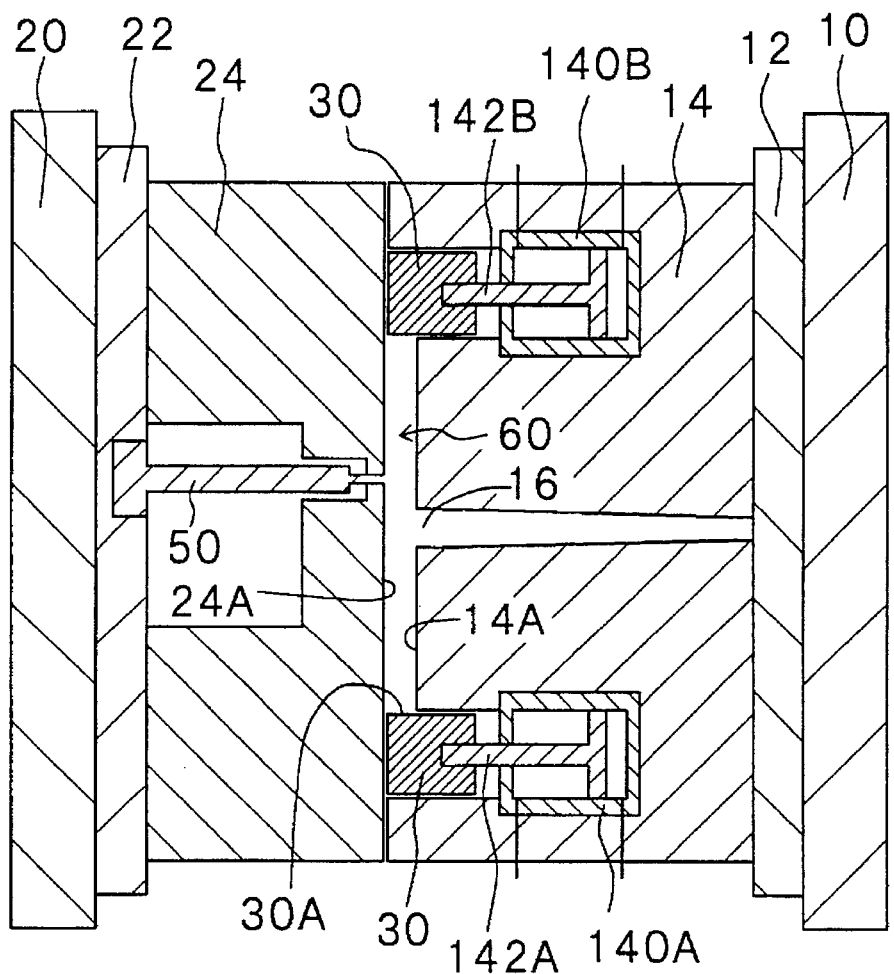
FIG. 20 is a schematic cross-sectional view of a mold apparatus used in Example 5 after a mold is clamped and after an intermediate mold member is brought into intimate contact with a movable mold member.
Figure 21:
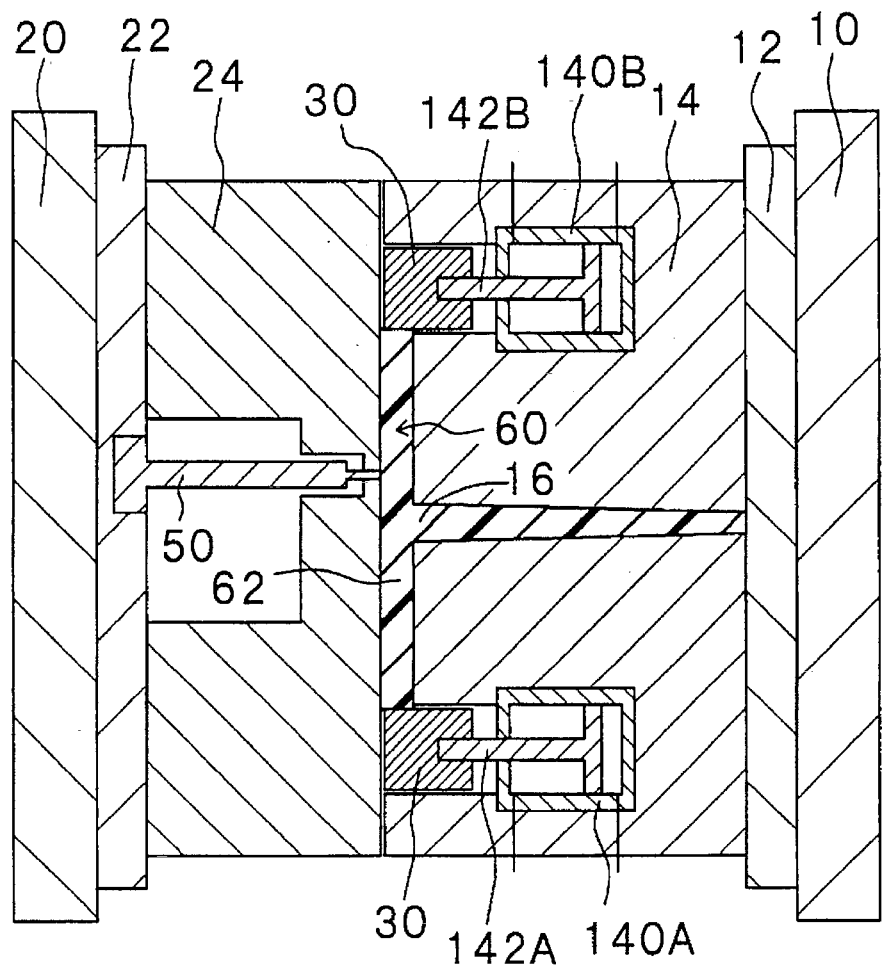
FIG. 21 is a schematic cross-sectional view of a mold apparatus used in Example 5 after the injection of a molten resin is initiated.
Figure 22:
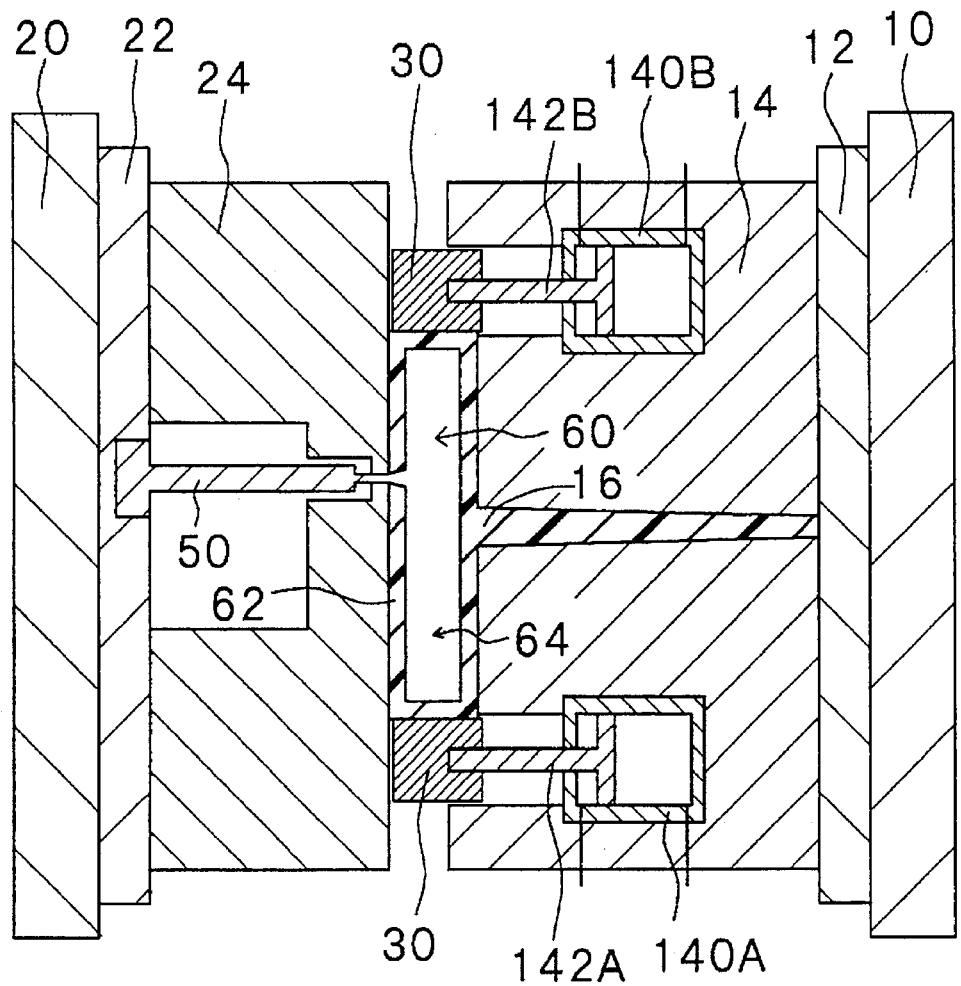
FIG. 22 is a schematic cross-sectional view of a mold apparatus used in Example 5 after the introduction of a pressurized fluid is initiated and after the movement of a movable mold member is finished.
Figure 23:
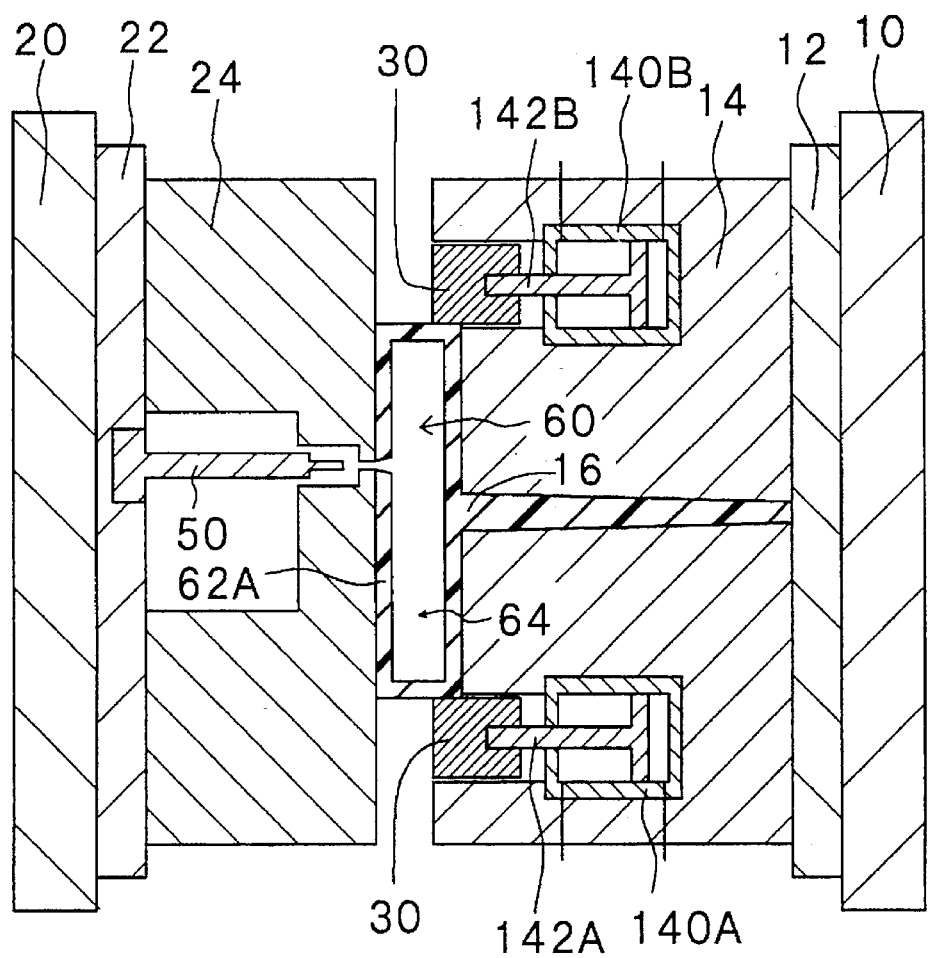
FIG. 23 is a schematic cross-sectional view of a mold apparatus used in Example 5 after an intermediate mold member is moved.

In the mold apparatus as the fourth embodiment of the present invention as shown in FIGS. 18 to 24, unlike the mold apparatus in the third embodiment, the fluid cylinders 140A and 140B are attached to the fixed mold member 14, and the output rods 142A and 142B of the fluid cylinders 140A and 140B are connected to the intermediate mold member 30. The mold apparatus in the fourth embodiment of the present invention can also use hydraulic cylinders as the fluid cylinders 140A and 140B. As shown in FIG. 21, by actuating the fluid cylinders 140A and 140B, the intermediate mold member 30 is energized to the movable mold member 24 side so that the intermediate mold member 30 is brought into intimate contact with the movable mold member 24. As shown in FIGS. 22 and 23, the intermediate mold member 30 can be energized to the fixed mold member 14 side by reversibly actuating the fluid cylinders 140A and 140B, so that the intermediate mold member 30 can be pulled back. That is, the intermediate mold member 30 can be energized to the fixed mold member 14 side by the fluid cylinders 140A and 140B before the mold is opened. Further, as shown in FIG. 21, when the mold is clamped by actuating the movable platen moving means, the intermediate mold member 30 is energized by the fluid cylinders 140A and 140B so that it is brought into intimate contact with the movable mold member 24. Further, as shown in FIGS. 21 and 22, the movable mold member 24 is moved in the mold opening direction by actuating the movable platen moving means with keeping the intermediate mold member 30 in intimate contact with the movable mold member 24 by the fluid cylinders 140A and 140B, whereby the distance of the cavity 60 in the mold opening direction can be increased for expanding the volume of the cavity 60. The intermediate mold member 30 is provided so as to surround the top portion of the fixed mold member 14 (that part of the fixed mold member 14 which constitutes a cavity wall surface 14A).

Figure 26A:
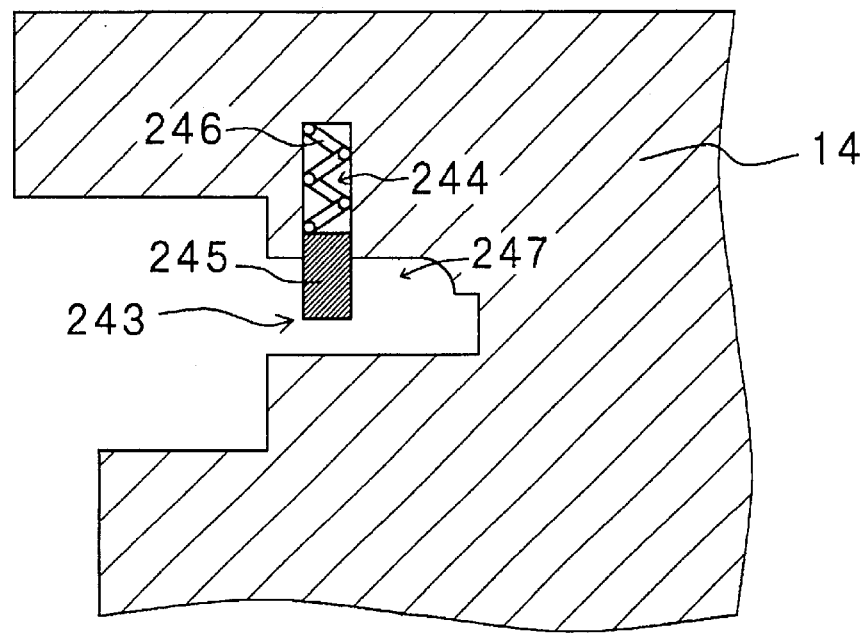
FIGS. 26A and 26B are enlarged schematic cross-sectional views of a clamp mechanism of a mold apparatus used in Example 6.
Figure 26B:
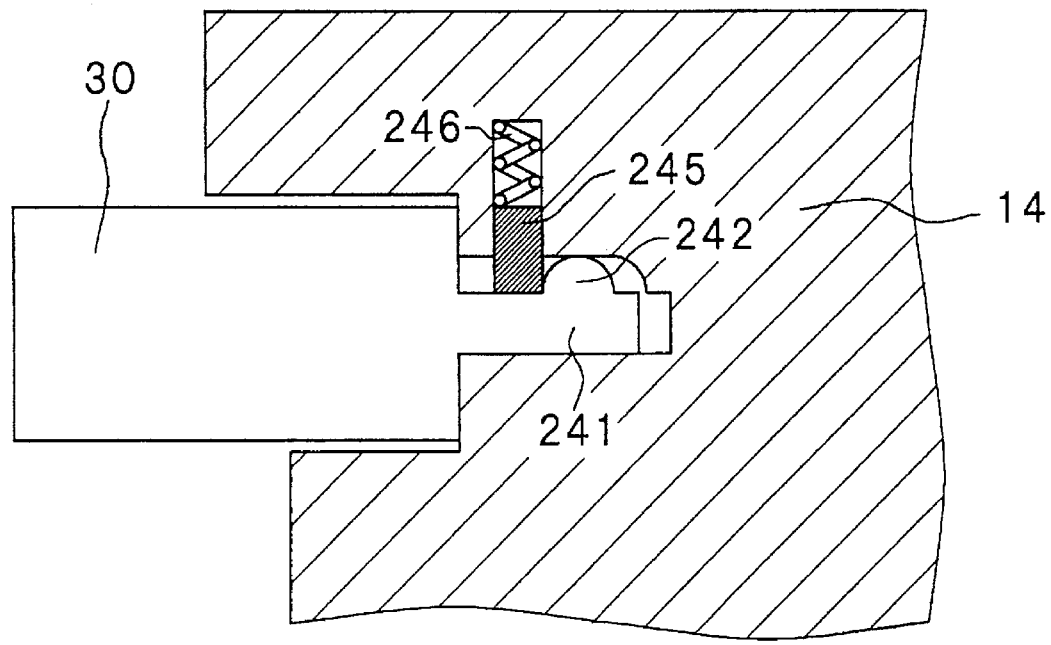
Figure 27:
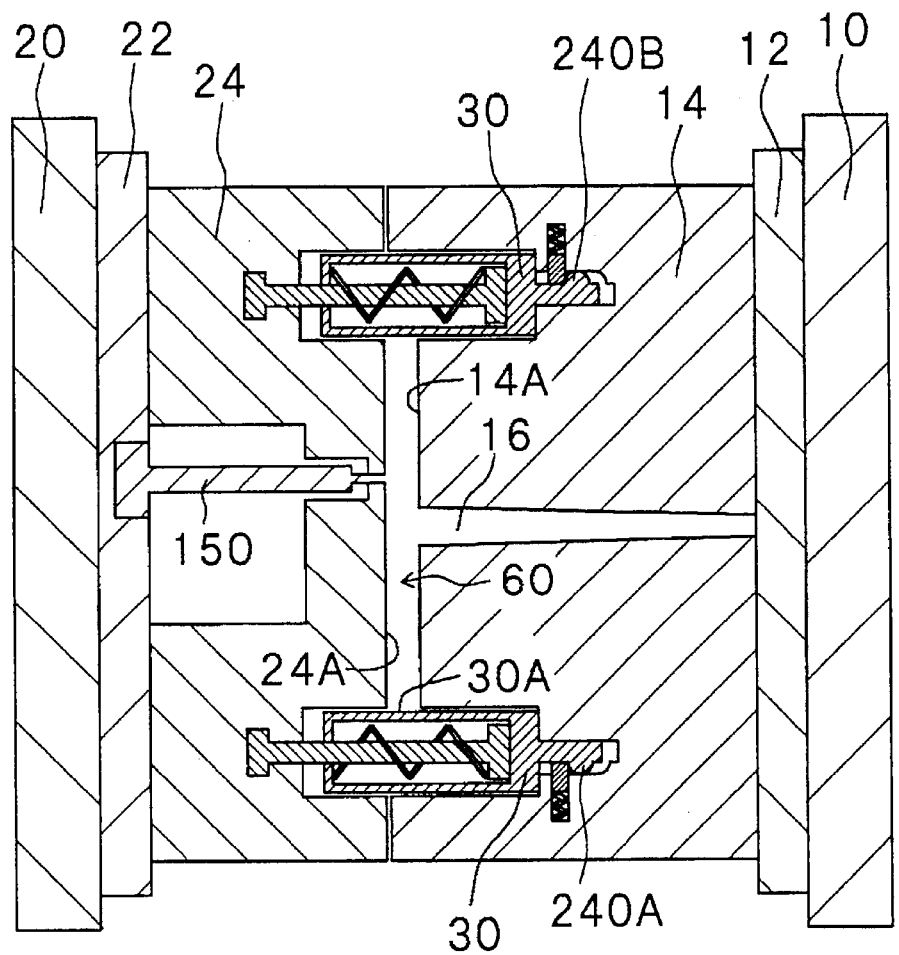
FIG. 27 is a schematic cross-sectional view of a mold apparatus used in Example 6 after a mold is clamped.
Figure 28:
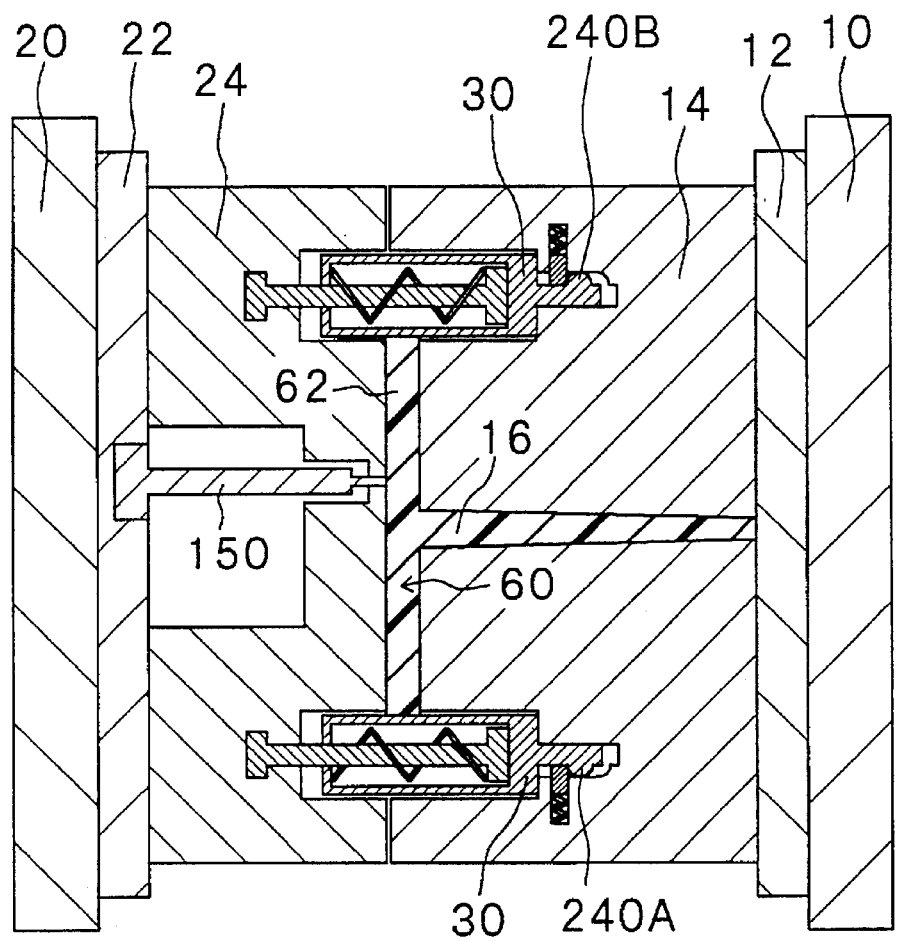
FIG. 28 is a schematic cross-sectional view of a mold apparatus used in Example 6 after the injection of a molten resin is initiated.
Figure 29:
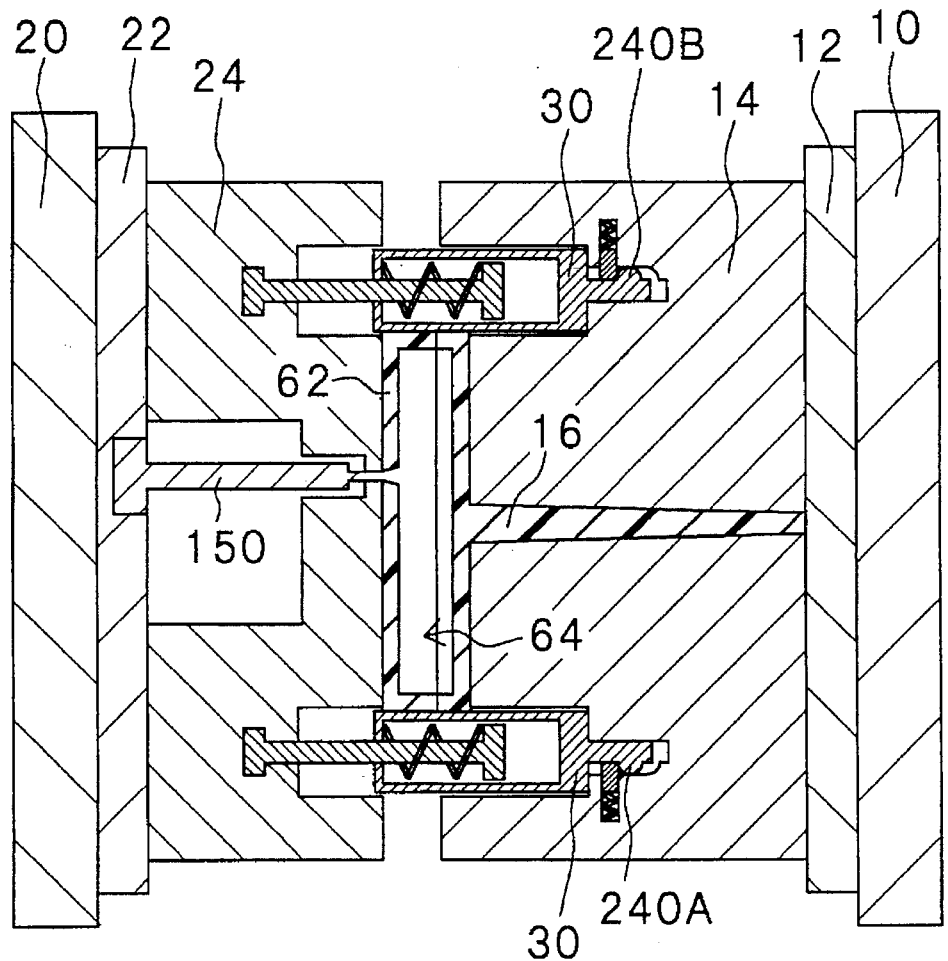
FIG. 29 is a schematic cross-sectional view of a mold apparatus used in Example 6 after the introduction of a pressurized fluid is initiated and after the movement of a movable mold member is finished.

In the mold apparatus as the fifth embodiment of the present invention as shown in FIGS. 25 to 30, intermediate mold member fixing means are formed of four clamp mechanism provided in the intermediate mold member 30 and the fixed mold member 14. FIGS. 25 to 30 show two of them as numerals 240A and 240B. As shown in FIGS. 28 and 29, the movable mold member 24 is moved in the mold opening direction by actuating the movable platen moving means with keeping the intermediate mold member 30 fixed to the fixed mold member 14 by the intermediate mold member fixing means 240A and 240B and with keeping the intermediate mold member 30 in intimate contact with the movable mold member 24, whereby the distance of the cavity 60 in the mold opening direction can be increased for expanding the volume of the cavity 60. As shown in FIG. 27, the intermediate mold member 30 is provided so as to surround the top portion of the movable mold member 24 (that part of the movable mold member 24 which constitutes a cavity wall surface 24A), when the mold is clamped by actuating the movable platen moving means. The movable mold member 24 is provided with a concave portion 24B in which the intermediate mold member 30 is received.

FIGS. 26A and 26B show the details of the clamp mechanism in the mold apparatus as the fifth embodiment of the present invention. FIG. 26A is a schematic partial cross-sectional view of the fixed mold member 14. FIG. 26B is a schematic partial cross-sectional view of the fixed mold member 14 after the intermediate mold member 30 is fixed to the fixed mold member 14. FIGS. 26B omits the showing of a guide rod 33 and a spring 32. The clamp mechanism has a projection portion 241 projected from the intermediate mold member 30, an opening portion 243 which is provided in the fixed mold member 14 and in which the projection portion 241 fits, a small opening portion 244 extending perpendicularly from the opening portion 243 provided in the fixed mold member 14, a pin 245 provided in the small opening portion 244 and a spring 246 attached to the pin 245. The top portion of the projection portion 241 has a convex portion 242. The opening portion 243 has a concave portion 247 in which the convex portion 242 fits. The intermediate mold member 30 is fixed to the fixed mold member 14 by inserting the projection portion 241 into the opening portion 243 over the pin 245. The convex portion 242 provided in the top portion of the projection portion 241 and the pin 245 are engaged with each other, and the pin 245 is pressed with a spring 246, whereby the projection portion 241 is prevented from coming off from the opening portion 243 when the distance of the cavity 60 in the mold opening direction is increased by moving the movable mold member 24 in the mold opening direction by actuating the movable platen moving means. Alternatively, the fixed mold member 14 may be provided with a projection portion, and the intermediate mold member 30 may be provided with an opening portion in which this projection portion fits.

Figure 25:
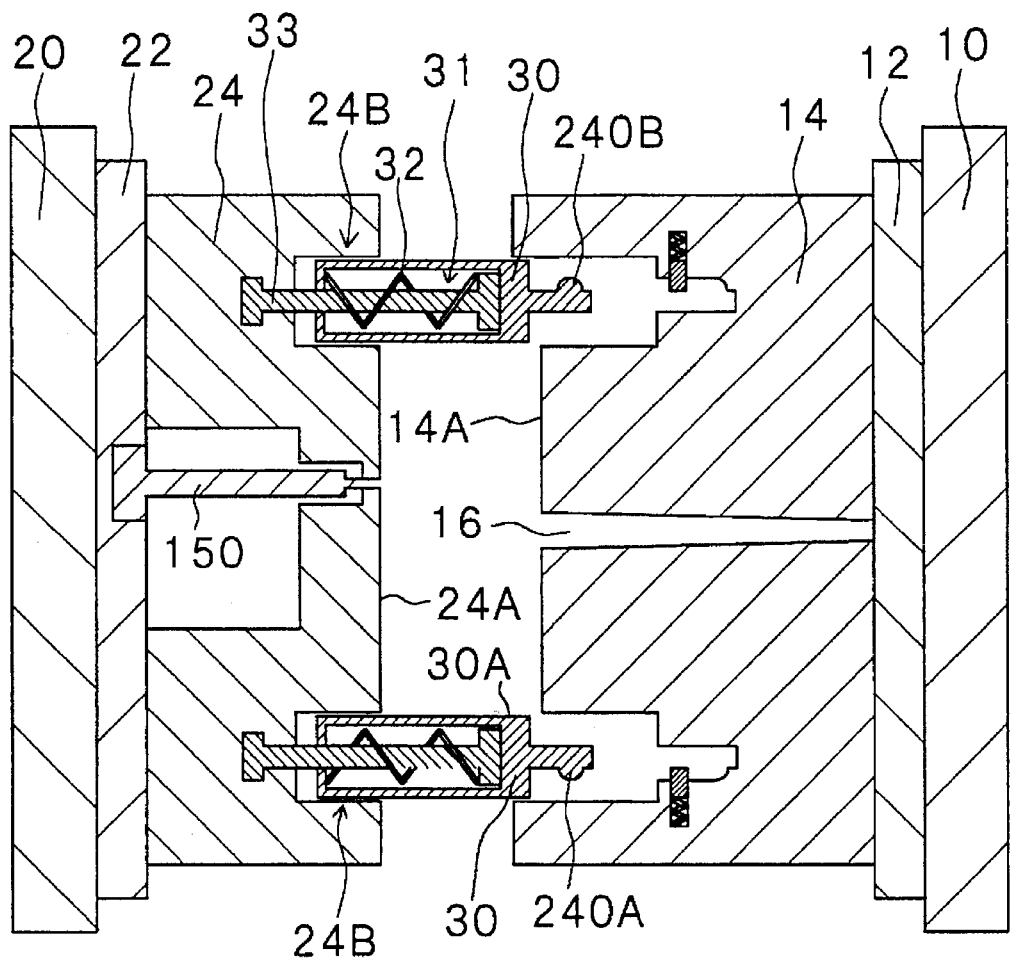
FIG. 25 is a schematic cross-sectional view of a mold apparatus used in Example 6 before a mold is clamped.

As shown in FIG. 25, the intermediate mold member 30 has a hollow portion 31. One end of a guide rod 33 is attached to the movable mold member 24, and the other end of the guide rod 33 is encased in the hollow portion 31 of the intermediate mold member 30. Further, a spring 32 for energizing the intermediate mold member 30 toward the movable mold member 24 is encased in the hollow portion 31 of the intermediate mold member 30. In this structure, the intermediate mold member 30 is reliably guided along the guide rod 33 when the movable mold member 24 is moved.

Figure 31:
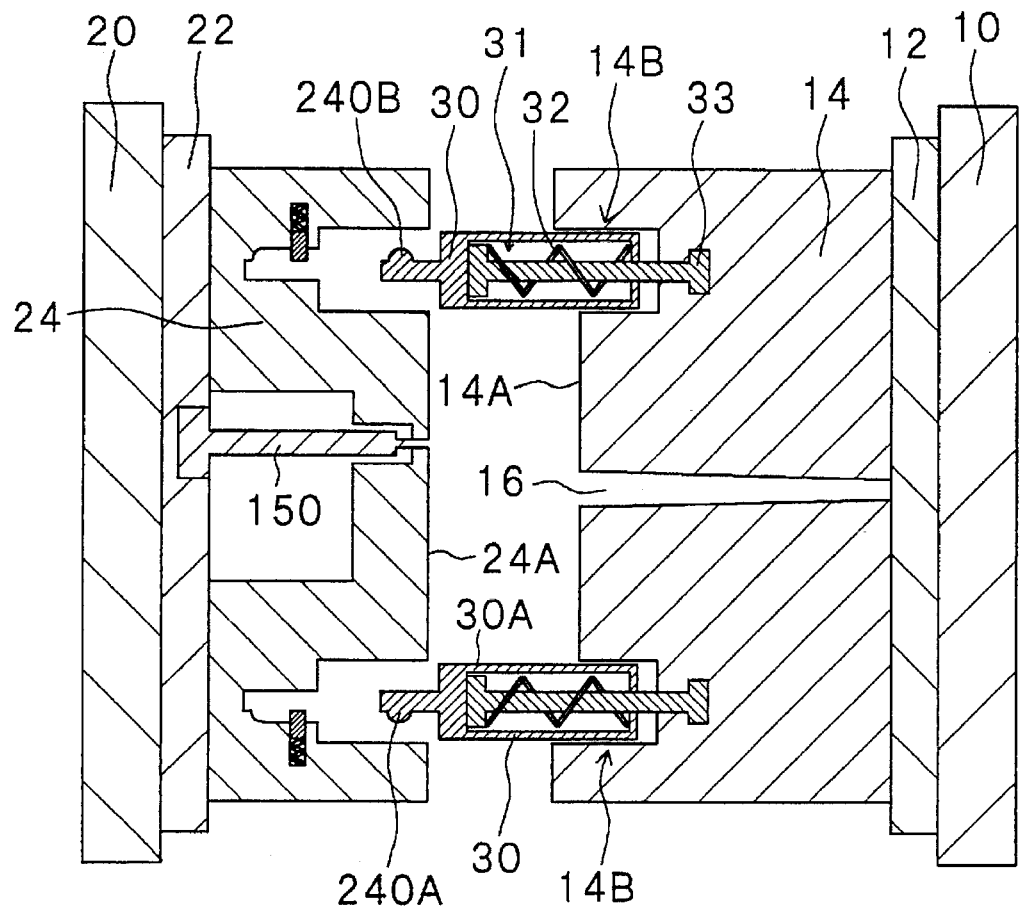
FIG. 31 is a schematic cross-sectional view of a mold apparatus used in Example 7 before a mold is clamped.
Figure 32:
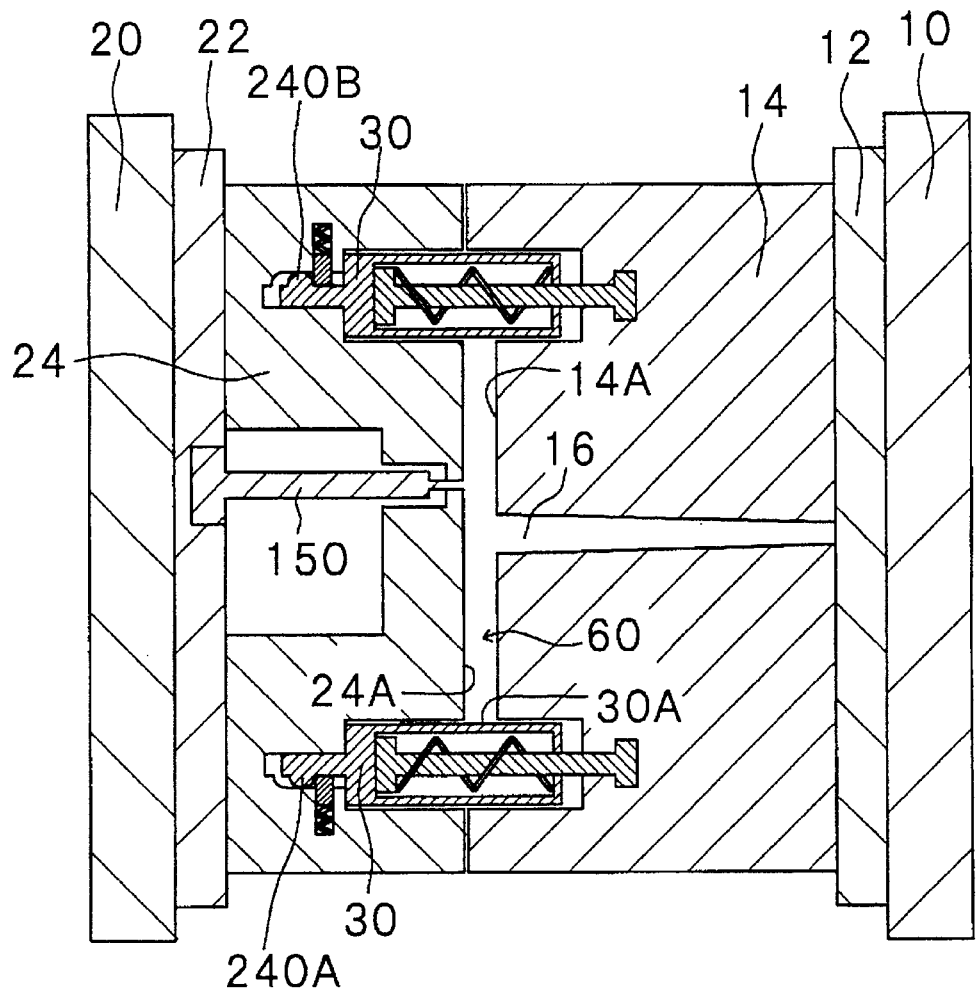
FIG. 32 is a schematic cross-sectional view of a mold apparatus used in Example 7 after a mold is clamped.
Figure 33:
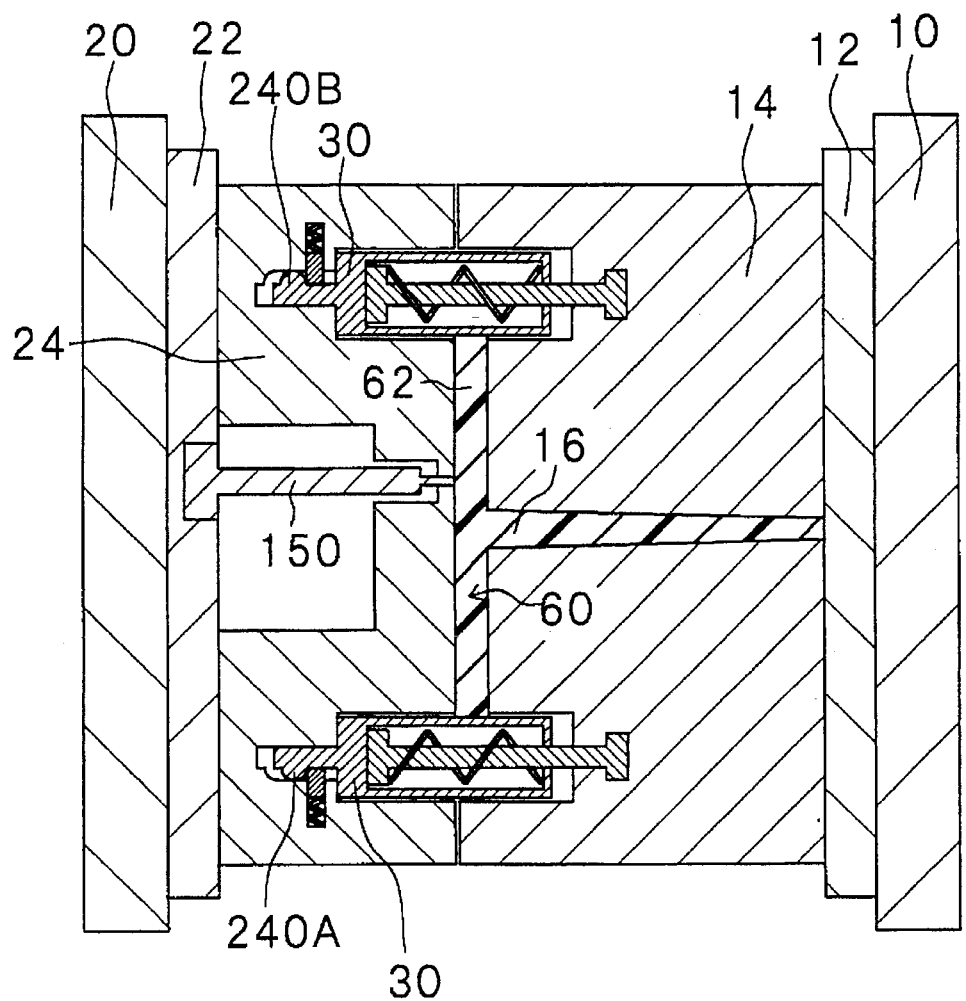
FIG. 33 is a schematic cross-sectional view of a mold apparatus used in Example 7 after the injection of a molten resin is initiated.
Figure 34:
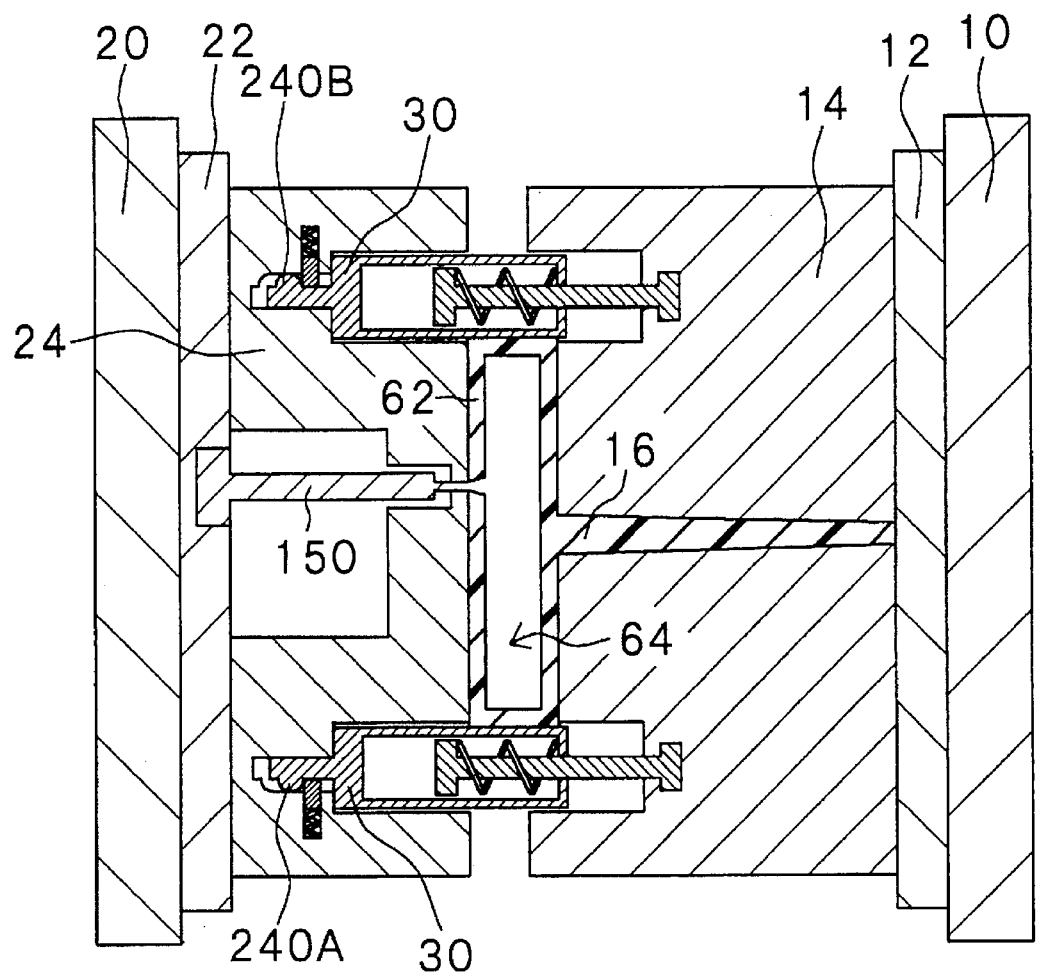
FIG. 34 is a schematic cross-sectional view of a mold apparatus used in Example 7 after the introduction of a pressurized fluid is initiated and after the movement of a movable mold member is finished.

In the mold apparatus as the sixth embodiment of the present invention as shown in FIGS. 31 to 35, unlike the mold apparatus as the fifth embodiment, the intermediate mold member fixing means are formed of four clamp mechanisms provided between the intermediate mold member 30 and the movable mold member 24. FIGS. 31 to 35 show two of them as numerals 240A and 240B. As shown in FIGS. 33 and 34, the movable mold member 24 is moved in the mold opening direction by actuating the movable platen moving means with keeping the intermediate mold member 30 fixed to the movable mold member 24 by the intermediate mold member fixing means 240A and 240B and with keeping the intermediate mold member 30 in intimate contact with the fixed mold member 14, whereby the distance of the cavity 60 in the mold opening direction can be increased for expanding the volume of the cavity 60. Further, as shown in FIG. 32, the intermediate mold member 30 is provided so as to surround the top portion of the fixed mold member 14 (that part of the fixed mold member 14 which constitutes a cavity wall surface 14A), when the mold is clamped by actuating the movable platen moving means. The structures of the clamp mechanism and the intermediate mold member 30 can be substantially the same as those shown in FIGS. 26A, 26B and 25. The fixed mold member 14 is provided with a concave portion 14B in which the intermediate mold member 30 is received.

Figure 38:
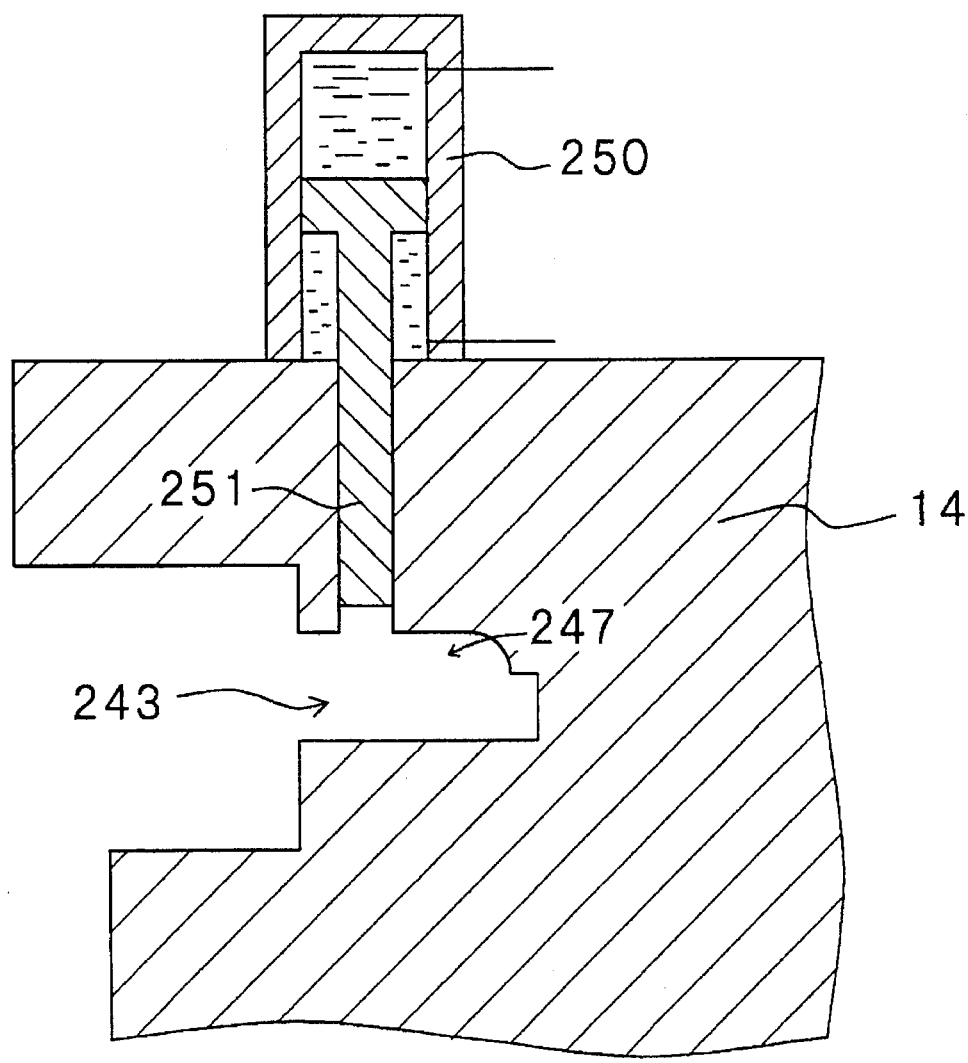
FIG. 38 is an enlarged schematic cross-sectional view of a clamp mechanism formed of a fluid clamp in a mold apparatus used in Example 6.
Figure 39:
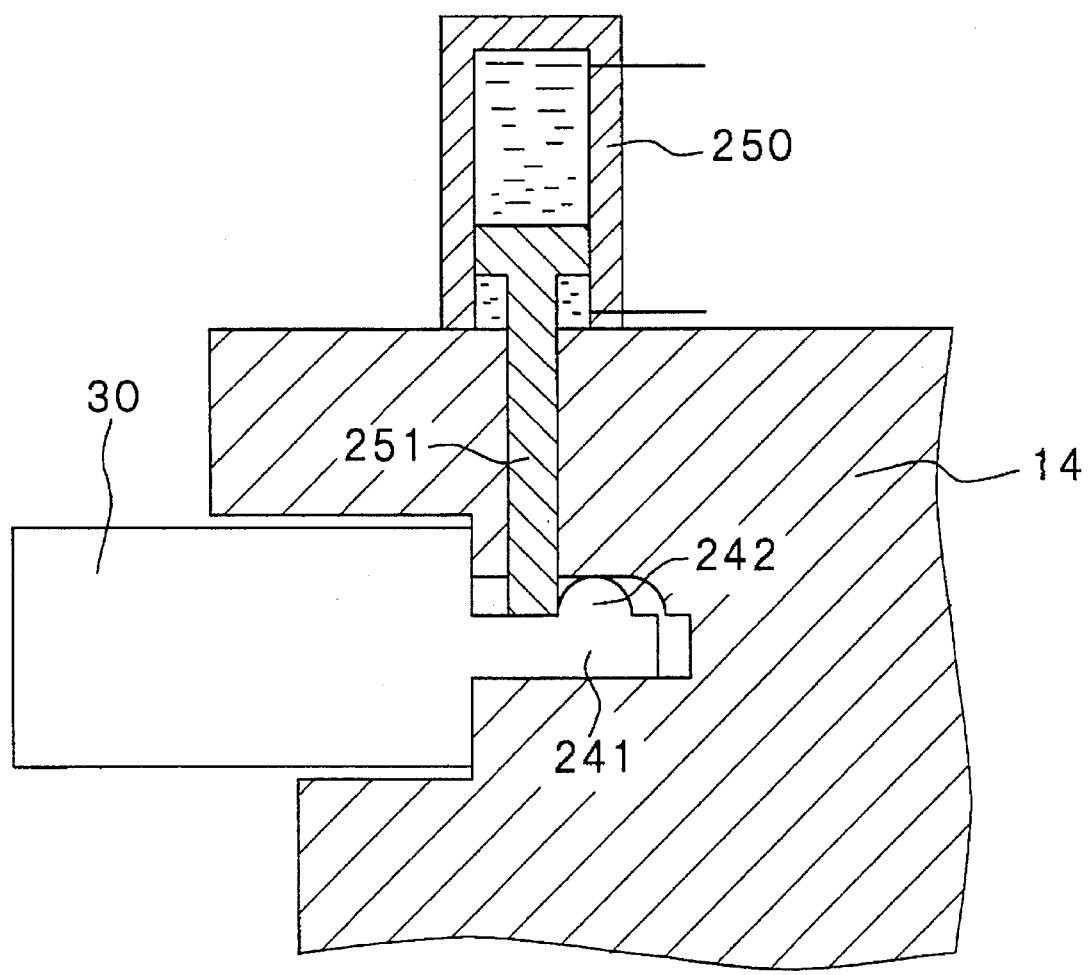
FIG. 39 is an enlarged schematic cross-sectional view of a clamp mechanism formed of a fluid clamp in a mold apparatus used in Example 6.

In the mold apparatus as the fifth and sixth embodiments of the present invention, the clamp mechanism may be constituted of a fluid clamp as shown in FIGS. 38 and 39 in which the fluid clamp is attached to the fixed mold member 14. The fluid clamp is constituted of a fluid cylinder 250 attached to the fixed mold member 14 and an output rod 251 extending from the fluid cylinder 250. The fluid cylinder may be selected from a hydraulic cylinder and an air cylinder. The top end of the output rod 251 and the convex portion 242 provided in the top portion of the projection portion 241 are engaged with each other by actuating the fluid cylinder 250 (see FIG. 39), and the projection portion 241 can be prevented from coming off from the opening portion 243 when the distance of the cavity 60 is increased by moving the movable mold member 24 in the mold opening direction by actuating the movable platen moving means.

Figure 36:
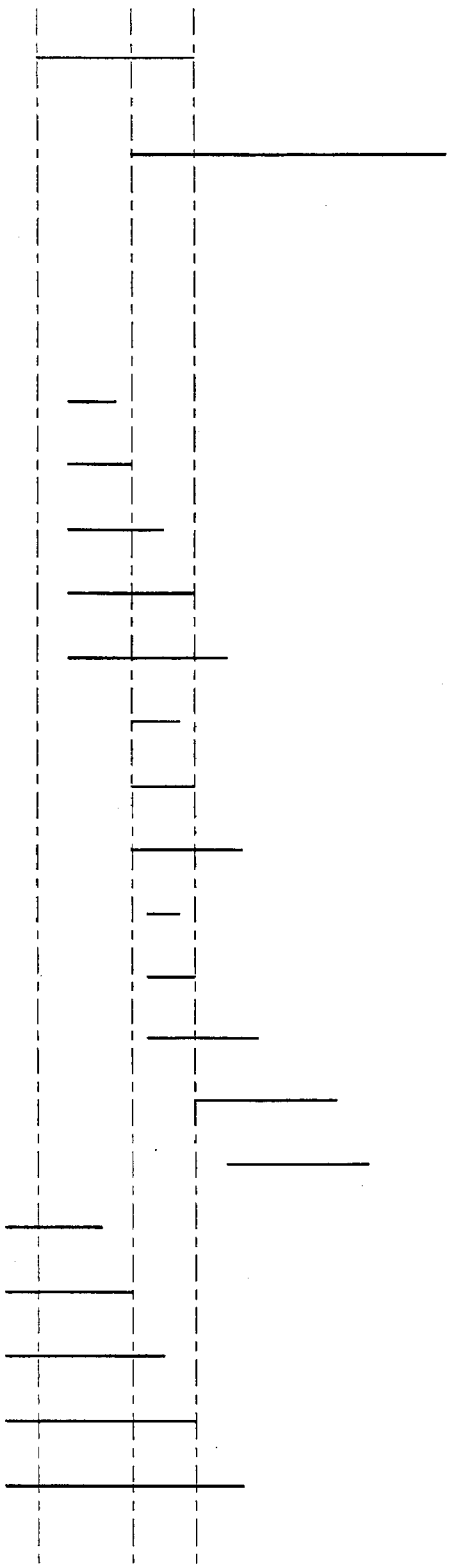
FIG. 36 schematically shows timings in initiating and terminating the injection of a molten resin, timing in initiating the introduction of a pressurized fluid and timings in initiating and finishing the movement of a movable mold member.
Figure 37:
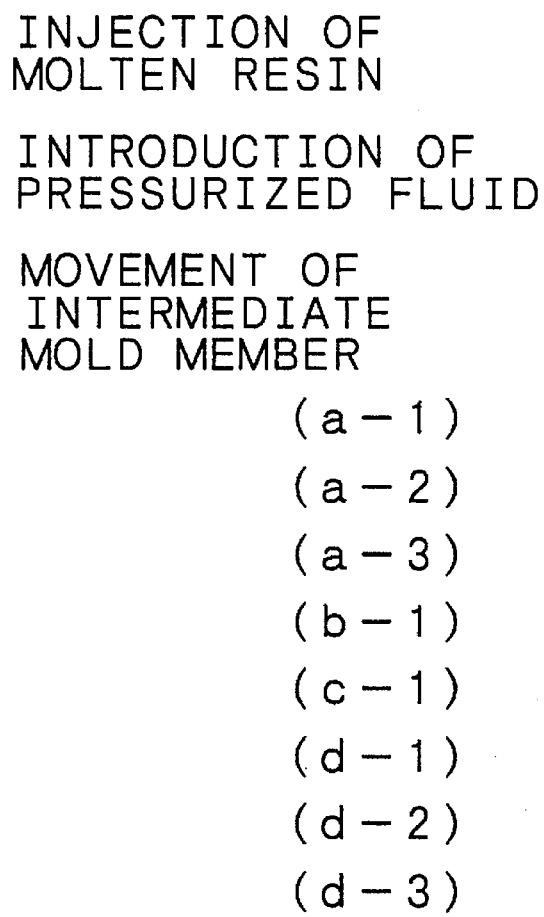
FIG. 37 schematically shows timings in initiating and terminating the injection of a molten resin, timing in initiating the introduction of a pressurized fluid and timings in initiating and finishing the movement of a movable mold member.

FIGS. 36 and 37 schematically show points of time when the alteration of the distance of the cavity 60 in the mold opening direction is initiated by actuating the movable platen moving means and terminated. In embodiments shown in FIG. 36, the introduction of a pressurized fluid into a molten resin in the cavity 60 is initiated while the molten resin is injected into the cavity 60. In embodiments shown in FIG. 37, the introduction of a pressurized fluid into a molten resin in the cavity 60 is initiated when or after the injection of the molten resin into the cavity 60 is finished. In FIGS. 36 and 37, line segments in the section of "MOVEMENT OF MOVABLE MOLD MEMBER" show that the movable mold member 24 is moving. The left end of each line segment shows the initiation of movement of the movable mold member 24, and the right end of each line segment shows the termination of movement of the movable mold member 24.

In (a-1) to (a-5) in FIG. 36, the movement of the movable mold member 24 is initiated while a molten resin 62 is injected into the cavity 60 and before the introduction of a pressurized fluid into the molten resin 62 is initiated. In (a-1) in FIG. 36, the movement of the movable mold member 24 is finished while the molten resin 62 is injected into the cavity 60 and before the introduction of the pressurized fluid into the molten resin 62 is initiated. In (a-2) in FIG. 36, the movement of the movable mold member 24 is finished while the molten resin 62 is injected into the cavity 60 and at the point of time when the introduction of the pressurized fluid into the molten resin 62 in the cavity 60 is initiated. In (a-3) in FIG. 36, the movement of the movable mold member 24 is finished while the molten resin 62 is injected into the cavity 60 and after the introduction of the pressurized fluid 62 in the cavity 60 is initiated. In (a-4) in FIG. 36, the movement of the movable mold member 24 is finished at the point of time when the injection of the molten resin into the cavity 60 is finished and while the pressurized fluid is introduced into the molten resin 62 in the cavity 60. In (a-5) in FIG. 36, the movement of the movable mold member 24 is finished after the injection of the molten resin 62 into the cavity 60 is finished and while the pressurized fluid is introduced into the molten resin 62 in the cavity 60.

In (b-1) to (b-3) in FIG. 36, the movement of the movable mold member 24 is initiated while the molten resin 62 is injected into the cavity 60 and at the point of time when the introduction of the pressurized fluid into the molten resin 62 in the cavity is initiated. In (b-1) in FIG. 36, the movement of the movable mold member 24 is finished while the molten resin 62 is injected into the cavity 60 and after the introduction of the pressurized fluid into the molten resin 62 in the cavity 60 is initiated. In (b-2) in FIG. 36, the movement of the movable mold member 24 is finished at the point of time when the injection of the molten resin 62 into the cavity 60 is finished and while the pressurized fluid is introduced into the molten resin 62 in the cavity 60. In (b-3) in FIG. 36, the movement of the movable mold member 24 is finished after the injection of the molten resin 62 into the cavity 60 is finished and while the pressurized fluid is introduced into the molten resin 62 in the cavity 60.

In (c-1) to (c-3) in FIG. 36, the movement of the movable mold member 24 is initiated while the molten resin 62 is injected into the cavity 60 and after the introduction of the pressurized fluid into the molten resin 62 in the cavity 60 is initiated. In (c-1) in FIG. 36, the movement of the movable mold member 24 is finished while the molten resin 62 is injected into the cavity 60 and after the introduction of the pressurized fluid into the molten resin 62 in the cavity 60 is initiated. In (c-2) in FIG. 36, the movement of the movable mold member 24 is finished at the point of time when the injection of the molten resin 62 into the cavity 60 is finished and while the pressurized fluid is introduced into the molten resin 62 in the cavity 60. In (c-3) in FIG. 36, the movement of the movable mold member 24 is finished after the injection of the molten resin 62 into the cavity 60 is finished and while the pressurized fluid is introduced into the molten resin 62 in the cavity 60.

In (d-1) in FIG. 36, the movement of the movable mold member 24 is initiated at the point of time when the injection of the molten resin 62 into the cavity 60 is finished and after the introduction of the pressurized fluid into the molten resin 62 in the cavity 60 is initiated. The movement of the movable mold member 24 is finished while the pressurized fluid is introduced into the molten resin 62 in the cavity 60.

In (e-1) in FIG. 36, the movement of the movable mold member 24 is initiated after the injection of the molten resin 62 into the cavity 60 is finished and while the pressurized fluid is introduced into the molten resin 62 in the cavity 60. The movement of the movable mold member 24 is finished while the pressurized fluid is introduced into the molten resin 62 in the cavity 60.

In (f-1) to (f-5) in FIG. 36, the movement of the movable mold member 24 is initiated before (or at the point of time when) the injection of the molten resin 62 into the cavity 60 is initiated. In (f-1) in FIG. 36, the movement of the movable mold member 24 is finished while the molten resin 62 is injected into the cavity 60 and before the introduction of the pressurized fluid into the molten resin 62 in the cavity 60 is initiated. In (f-2) in FIG. 36, the movement of the movable mold member 24 is finished while the molten resin 62 is injected into the cavity 60 and at the point of time when the introduction of the pressurized fluid into the molten resin 62 in the cavity 60 is initiated. In (f-3) in FIG. 36, the movement of the movable mold member 24 is finished while the molten resin 62 is injected into the cavity 60 and while the pressurized fluid is introduced into the molten resin 62 in the cavity 60. In (f-4) in FIG. 36, the movement of the movable mold member 24 is finished at the point of time when the injection of the molten resin 62 into the cavity 60 is finished and while the pressurized fluid is introduced into the molten resin 62 in the cavity 60. In (f-5) in FIG. 36, the movement of the movable mold member 24 is finished after the injection of the molten resin 62 into the cavity 60 is finished and while the pressurized fluid is introduced into the molten resin 62 in the cavity 60.

In (a-1) to (a-3) in FIG. 37, the movement of the movable mold member 24 is initiated while the molten resin 62 is injected into the cavity 60 and before the introduction of the pressurized fluid into the molten resin 62 in the cavity 60 is initiated. In (a-1) in FIG. 37, the movement of the movable mold member 24 is finished while the molten resin 62 is injected into the cavity 60 and before the introduction of the pressurized fluid into the molten resin 62 in the cavity 60 is initiated. In (a-2) in FIG. 37, the movement of the movable mold member 24 is finished at the point of time when the injection of the molten resin 62 into the cavity 60 is finished. In (a-3) in FIG. 37, the movement of the movable mold member 24 is finished after the injection of the molten resin 62 into the cavity 60 is finished and while the pressurized fluid is introduced into the molten resin 62 in the cavity 60.

In (b-1) in FIG. 37, the movement of the movable mold member 24 is initiated at the point of time when the injection of the molten resin 62 into the cavity 60 is finished. The movement of the movable mold member 24 is finished while the pressurized fluid is introduced into the molten resin 62 in the cavity 60.

In (c-1) in FIG. 37, the movement of the movable mold member 24 is initiated after the injection of the molten resin 62 into the cavity 60 is finished and at the point of time when, or after, the introduction of the pressurized fluid into the molten resin 62 in the cavity 60 is initiated. The movement of the movable mold member 24 is finished while the pressurized fluid is introduced into the molten resin 62 in the cavity 60.

In (d-1) to (d-3) in FIG. 37, the movement of the movable mold member 24 is initiated before (or at the point of time when) the injection of the molten resin 62 into the cavity 60 is initiated. In (d-1) in FIG. 37, the movement of the movable mold member 24 is finished while the molten resin 62 is injected into the cavity 60 and before the introduction of the pressurized fluid into the molten resin 62 in the cavity 60 is initiated. In (d-2) in FIG. 37, the movement of the movable mold member 24 is finished at the point of time when the injection of the molten resin 62 into the cavity 60 is finished. In (d-3) in FIG. 37, the movement of the movable mold member 24 is finished after the injection of the molten resin 62 into the cavity 60 is finished and while the pressurized fluid is introduced into the molten resin 62 in the cavity 60.

The injection molding method of the present invention using the above mold apparatus will be specifically explained hereinafter.

EXAMPLE 1

Example 1 relates to the injection molding method directed to the first aspect of the present invention. In Example 1, the mold apparatus as the first embodiment shown in FIGS. 1 to 6 was used. The cavity 60 in the mold-clamped state as shown in FIG. 2 was arranged to have a distance of 6 mm in the mold opening and closing directions. The movable mold member 24 arranged to move together with the movable platen 20 was arranged to move at a distance of 14 mm in the mold opening direction by actuating the movable platen moving means 28. The cavity 60 in the state shown in FIG. 5 had a distance of 20 mm in the mold opening and closing directions.

The pressurized fluid introduction portion 50 was provided in the molten resin injection portion 16 provided in the fixed mold member 14, and the molten resin injection portion 16 was opened toward the cavity 60. Further, the cavity wall surface 24A of the movable mold member 24 was finely embossed, and the cavity wall surface 14A of the fixed mold member 14 was leather-grained. FIG. 1 shows a state of the mold before the mold was clamped. FIG. 2 shows a state of the mold after the movable platen 20 was moved forward by actuating the movable platen moving means 28 and the mold was clamped at a high pressure. When the mold was clamped, the intermediate mold member 30 was in intimate contact with the fixed mold member 14 and the movable mold member 24.

A polycarbonate resin (trade name: Iupilon S3000R, black, supplied by Mitsubishi Engineering-Plastics Corp.) was plasticized, melted and metered in a heating cylinder (not shown) of an injection molding machine at a resin temperature of 280° C. The molten resin 62 of the polycarbonate resin was injected into the cavity 60 at an injection pressure of 1200 kgf/cm² through the molten resin injection portion 16. This state is shown in FIG. 3. After the injection of the molten resin 62 was finished, a dwell pressure of 800 kgf/cm² was applied for 5 seconds to improve the imprintability of the emboss and leather grain formed on the cavity wall surfaces 24A and 14A to the resin.

Then, a pressurized fluid of nitrogen gas at 100 kg/cm²-G was introduced into the molten resin 62 in the cavity 60 through the pressurized fluid introduction portion 50. In 1 second after the initiation of the introduction of the pressurized fluid, for preventing the leakage of the molten resin 62 through the parting faces of the intermediate mold member 30 and the fixed mold member 14, the movable mold member 24 was moved in the mold opening direction by actuating the movable platen moving means 28 with keeping the intermediate mold member 30 in intimate contact with the fixed mold member 14 by the intermediate mold member sliding means 40A and 40B formed of springs, to increase the distance of the cavity 60 in the mold opening direction. FIG. 4 shows a state in which the movable mold member 24 was moving. A hollow structure 64 was being formed in the molten resin 62 by introducing the pressurized fluid into the molten resin 62 in the cavity 60. Finally, the movable platen 20 arranged to move together with the movable mold member 24 was moved back 14 mm from the mold-clamping position by actuating the movable platen moving means 28 to increase the volume of an injection-molded article having the hollow structure 64. This state is shown in FIG. 5.

Figure 6:
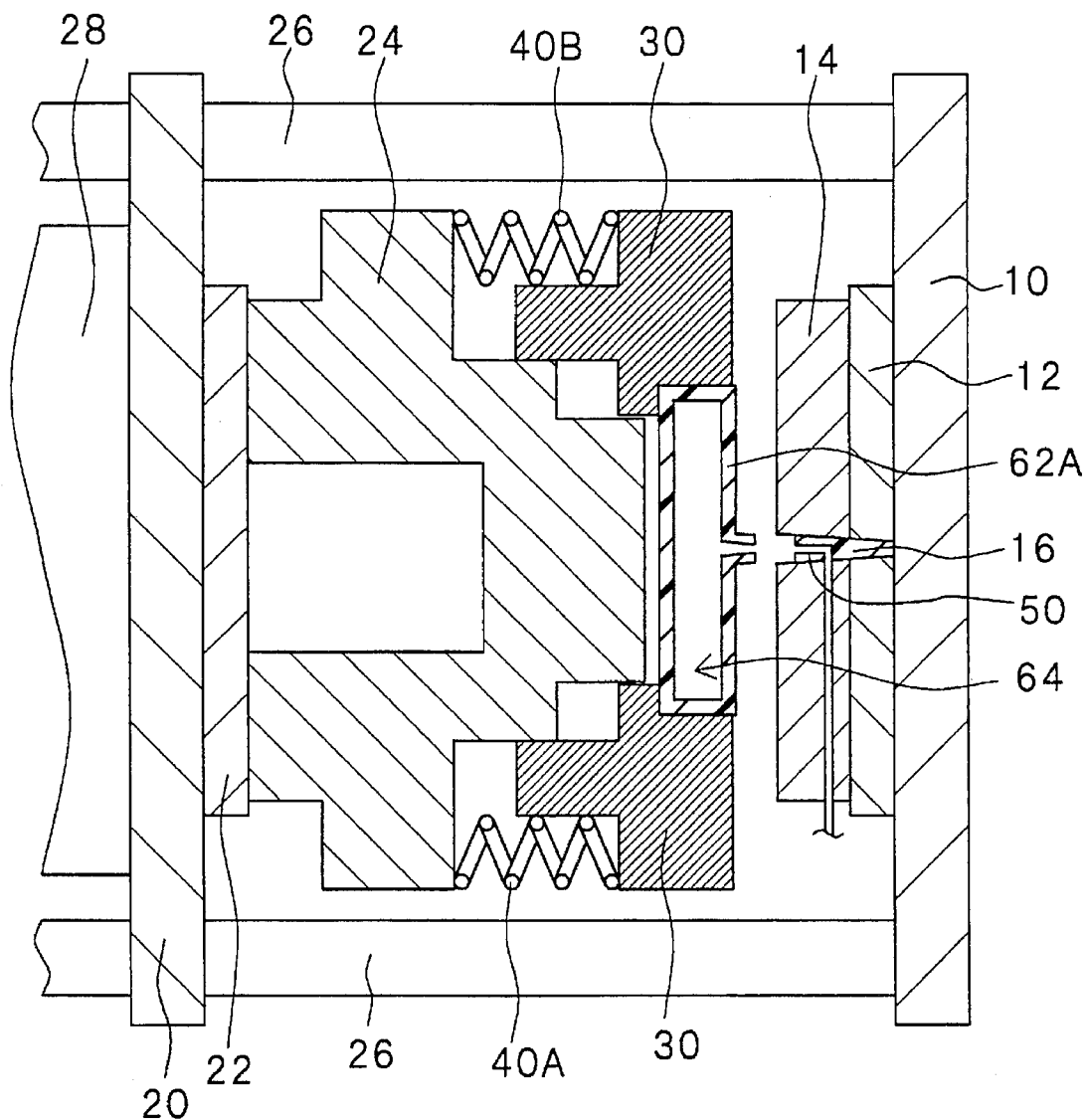
FIG. 6 is a schematic cross-sectional view of a mold apparatus used in Example 1 after a mold is opened.

Then, the resin in the cavity 60 was cooled and solidified for 100 seconds, and then, the pressurized fluid in the hollow structure 64 within the resin 62A was released into atmosphere through the molten resin injection portion 16 and the pressurized fluid introduction portion 50. Then, the mold was opened by actuating the movable platen moving means 28. This state is shown in FIG. 6. Finally, the injection-molded article was taken out of the mold with an injection-molded article ejection device (not shown) constituted of a fluid cylinder (for example, an air pressure) and an ejection pin provided in the movable mold member 24.

The so-obtained injection-molded article had an intended hollow structure and had a fine appearance free of any sink mark. The leather grain provided on the cavity wall surface 14A of the fixed mold member 14 had been finely imprinted to the injection-molded article surface, while the imprintability of the fine emboss provided on the cavity wall surface 24A of the movable mold member 24 to the injection-molded article surface was insufficient to some extent.

COMPARATIVE EXAMPLE 1

Example 1 was repeated except that the intermediate mold member sliding means 40A and 40B formed of springs were removed.

The introduction of a pressurized fluid into the molten resin 62 in the cavity 60 was initiated, and in 1 second thereafter, the movable platen which was arranged to move together with the movable mold member 24 was moved back by actuating the movable platen moving means. However, as soon as the movable platen was moved back as above, the molten resin leaked through the parting faces of the intermediate mold member 30 and the fixed mold member 14, and no intended injection-molded article was obtained.

EXAMPLE 2

The injection molding was carried out with the same mold apparatus as that used in Example 1. The difference of Example 2 from Example 1 was that the movable mold member 24 was moved in the mold closing direction by actuation the movable platen moving means 28 with keeping the intermediate mold member 30 in intimate contact with the fixed mold member 14 by the intermediate mold member sliding means 40A and 40B after the injection of the molten resin 62 into the cavity 60, so that the movable mold member 24 was used to exert a pressure (a compressive force) on the molten resin 62 in the cavity 60 in the mold closing direction.

The movable platen 20 was moved forward by actuating the movable platen moving means 28 to clamp the mold at a high pressure (see FIG. 2). Then, the movable mold member 24 was moved 2 mm in the mold opening direction by actuating the movable platen moving means 28 with keeping the intermediate mold member 30 pressed to the fixed mold member 14, and this state was maintained.

A polycarbonate resin (trade name: Iupilon S3000R, black, supplied by Mitsubishi Engineering-Plastics Corp.) was plasticized, melted and metered in a heating cylinder (not shown) of an injection molding machine at a resin temperature of 280° C. The molten resin 62 of the polycarbonate resin was injected into the cavity 60 at an injection pressure of 1200 kgf/cm² through the molten resin injection portion 16 (see FIG. 3). Immediately after the injection of the molten resin 62 was finished, the movable platen 20 which was arranged to move together with the movable mold member 24 was moved forward in the mold closing direction at a mold clamping force of 100 metric tons by actuating the movable platen moving means 28, and this state was maintained for 2 seconds. The reason for applying the compressive force on the molten resin 62 in the cavity 60 was to improve the imprintability of the emboss and leather grain formed on the cavity wall surfaces 24A and 14A to the resin. Alternatively, the movement of the movable mold member 24 may be initiated in the mold closing direction during the injection of the molten resin 62 into the cavity 60.

Then, a pressurized fluid of nitrogen gas at 100 kg/cm²-G was introduced into the molten resin 62 in the cavity 60 through the pressurized fluid introduction portion 50. In 1 second after the initiation of the introduction of the pressurized fluid, for preventing the leakage of the molten resin 62 through the parting faces of the intermediate mold member 30 and the fixed mold member 14, the movable mold member 24 was moved in the mold opening direction by actuating the movable platen moving means 28 with keeping the intermediate mold member 30 in intimate contact with the fixed mold member 14 by the intermediate mold member sliding means 40A and 40B formed of springs, to increase the distance of the cavity 60 in the mold opening direction. FIG. 4 shows a state in which the movable mold member 24 was moving. A hollow structure 64 was being formed in the molten resin 62 by introducing the pressurized fluid into the molten resin 62 in the cavity 60. Finally, the movable platen 20 arranged to move together with the movable mold member 24 was moved back 14 mm from the mold-clamping position by actuating the movable platen moving means 28 to increase the volume of an injection-molded article having the hollow structure 64. This state is shown in FIG. 5.

Then, the resin in the cavity 60 was cooled and solidified for 100 seconds, and then, the pressurized fluid in the hollow structure 64 within the resin 62A was released into atmosphere through the molten resin injection portion 16 and the pressurized fluid introduction portion 50. Then, the mold was opened by actuating the movable platen moving means 28. This state is shown in FIG. 6. Finally, the injection-molded article was taken out of the mold with an injection-molded article ejection device (not shown) provided in the movable mold member 24.

The so-obtained injection-molded article had an intended hollow structure and had a fine appearance free of any sink mark. The leather grain provided on the cavity wall surface 14A of the fixed mold member 14 had been finely imprinted to the injection-molded article surface. Further, the fine emboss provided on the cavity wall surface 24A of the movable mold member 24 had been finely imprinted to the injection-molded article surface.

In Example 2, at the time of the initiation of the injection of the molten resin, the cavity was arranged to have a greater distance in the mold opening and closing directions than it was generally required to have, while the movement of the movable mold member 24 in the mold opening direction from the mold-clamping position may be initiated before, on or after the injection of the molten resin is initiated, and the movable mold member 24 may be moved in the mold closing direction for applying the compressive force to the molten resin in the cavity while or after the molten resin is injected into the cavity.

EXAMPLE 3

Example 3 also relates to the injection molding method directed to the first aspect of the present invention. The injection molding method in Example 3 used the mold apparatus as the second embodiment shown in FIGS. 7 to 11. The cavity 60 in the mold-clamped state as shown in FIG. 8 was arranged to have a distance of 6 mm in the mold opening and closing directions. The movable mold member 24 arranged to move together with the movable platen 20 was arranged to move at a distance of 14 mm in the mold opening direction by actuating the movable platen moving means. The cavity 60 in the state shown in FIG. 10 had a distance of 20 mm in the mold opening and closing directions.

The molten resin injection portion 16 was provided in the fixed mold member 14 and was opened toward the cavity 60. The pressurized fluid introduction portion 150 was provided in the movable mold member 24. The cavity wall surface 24A of the movable mold member 24 was finely embossed, and the cavity wall surface 14A of the fixed mold member 14 was leather-grained. FIG. 7 shows a state of the mold before the mold was clamped. FIG. 8 shows a state of the mold after the movable platen 20 was moved forward by actuating the movable platen moving means and the mold was clamped at a high pressure. When the mold was clamped, the intermediate mold member 30 was in intimate contact with the movable mold member 24.

A polycarbonate resin (trade name: Iupilon S3000R, black, supplied by Mitsubishi Engineering-Plastics Corp.) was plasticized, melted and metered in a heating cylinder (not shown) of an injection molding machine at a resin temperature of 280° C. The molten resin 62 of the polycarbonate resin was injected into the cavity 60 at an injection pressure of 1200 kgf/cm² through the molten resin injection portion 16. This state is shown in FIG. 9. After the injection of the molten resin 62 was finished, a dwell pressure of 800 kgf/cm² was applied for 5 seconds to improve the imprintability of the emboss and leather grain formed on the cavity wall surfaces 24A and 14A to the resin.

Then, a pressurized fluid of nitrogen gas at 100 kg/cm²-G was introduced into the molten resin 62 in the cavity 60 through the pressurized fluid introduction portion 150. In 1 second after the initiation of the introduction of the pressurized fluid, for preventing the leakage of the molten resin 62 through the parting faces of the intermediate mold member 30 and the movable mold member 24, the movable mold member 24 was moved in the mold opening direction by actuating the movable platen moving means with keeping the intermediate mold member 30 in intimate contact with the movable mold member 24 by the intermediate mold member sliding means 40A and 40B formed of springs, to increase the distance of the cavity 60 in the mold opening direction. Finally, the movable platen 20 arranged to move together with the movable mold member 24 was moved back 14 mm from the mold-clamping position by actuating the movable platen moving means to increase the volume of an injection-molded article having the hollow structure 64. This state is shown in FIG. 10.

Figure 11:
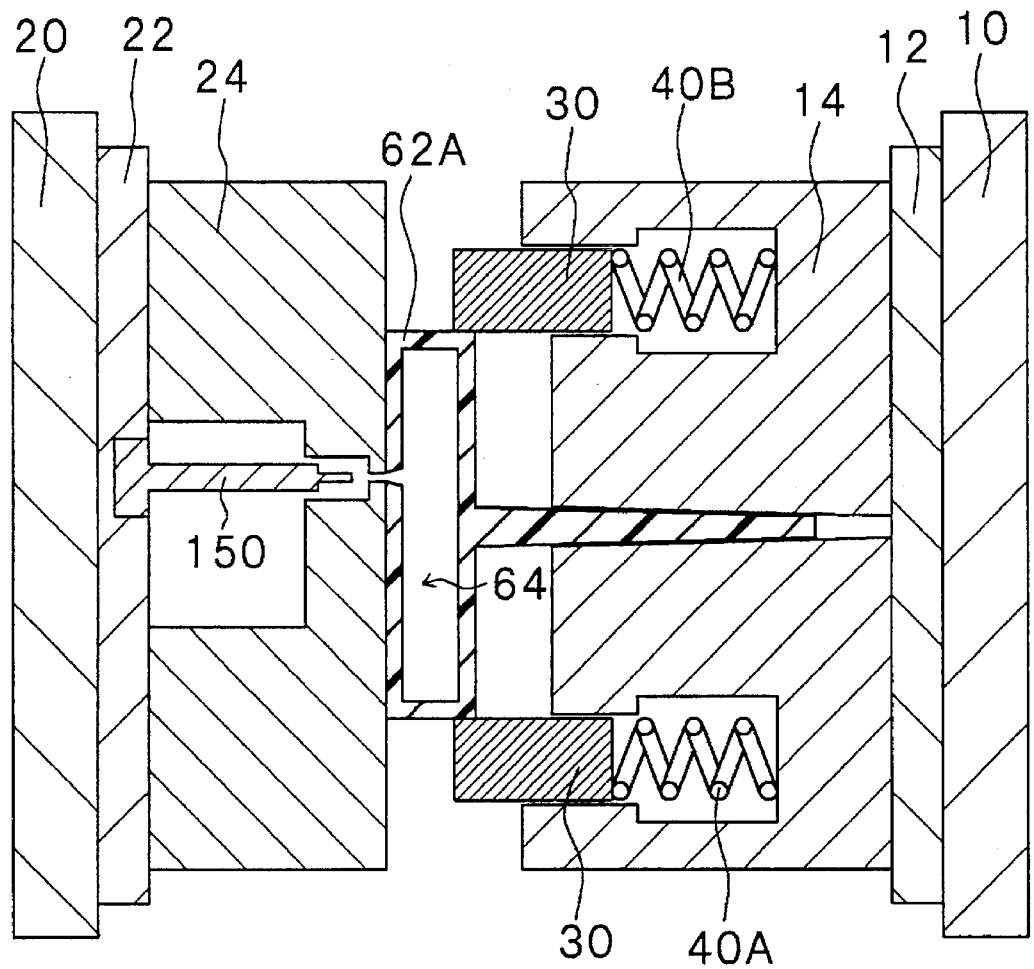
FIG. 11 is a schematic cross-sectional view of a mold apparatus used in Example 3 after a mold is opened.

Then, the resin in the cavity 60 was cooled and solidified for 100 seconds. Then, the pressurized fluid introduction portion 150 was moved back by a moving mechanism (not shown), and the pressurized fluid in the hollow structure 64 within the resin 62A was released into atmosphere through a space around the pressurized fluid introduction portion 150. Then, the mold was opened by actuating the movable platen moving means. This state after the mold was opened is shown in FIG. 11. Finally, the injection-molded article was taken out of the mold with an injection-molded article ejection device (not shown) provided in the movable mold member 24.

EXAMPLE 4

Example 4 also relates to the injection molding method directed to the first aspect of the present invention. The injection molding method in Example 4 used the mold apparatus in the third embodiment shown in FIGS. 12 to 17. The cavity 60 in the mold-clamped state as shown in FIG. 13 was arranged to have a distance of 7 mm in the mold opening and closing directions. The movable mold member 24 arranged to move together with the movable platen 20 was arranged to move at a distance of 15 mm in the mold opening direction by actuating the movable platen moving means. The cavity 60 in the state shown in FIG. 15 therefore had a distance of 22 mm in the mold opening and closing directions.

In Example 4, there was used a polycarbonate resin (trade name: Iupilon, grade, S3000, black, supplied by Mitsubishi Engineering-Plastics Corp.). Before molding, the resin was plasticized, melted and metered in a heating cylinder (not shown) of an injection molding machine at a resin temperature of 280° C.

In Example 4, as FIG. 12 shows a schematic cross section, the intermediate mold member 30 was energized to the movable mold member 24 side by fluid cylinders 140A and 140B before the mold was clamped. After the preparation of the molding was completed, the mold was clamped by actuating the movable platen moving means as shown in FIG. 13, whereby the resistance to the mold-clamping force was decreased. After the mold was clamped, the intermediate mold member 30 was in intimate contact with the fixed mold member 14 and the movable mold member 24 as shown in FIG. 13.

After the clamping of the mold was completed, the molten resin 62 was injected into the cavity 60 of the mold through the molten resin injection portion 16, as FIG. 14 shows a schematic cross section. In the mold apparatus, the mold-clamping force of 350 metric tons was maintained by actuating the movable platen moving means, and the cavity 60 was arranged to have a distance of 7 mm in the mold opening and closing directions. In this case, the fluid cylinders 140A and 140B formed of hydraulic cylinders energized the intermediate mold member 30 in the left-hand-side direction in FIG. 14. The cavity 60 was formed not only of the cavity wall surfaces 14A and 30A of the fixed mold member 14 and the intermediate mold member 30 but also of the cavity wall surface 24A of the movable mold member 24, so that it was sufficient to apply solely to the movable mold member 24 a force which could withstand the pressure caused by the molten resin 62 injected into the cavity 60. Therefore, the fluid cylinders 140A and 140B can be decreased in capacity.

After the injection of the molten resin 62 into the cavity 60 was finished and before the movable mold member 24 was moved, the fluid cylinders 140A and 140B were switched to energize the intermediate mold member 30 to the fixed mold member 14 side with the fluid cylinders 140A and 140B. Then, while the pressurized fluid was introduced to the molten resin 62 in the cavity 60 (more specifically, at the point of time when the introduction of the pressurized fluid into the molten resin 62 was initiated), the movable mold member 24 was moved in the mold opening direction by actuating the movable platen moving means with keeping the intermediate mold member 30 in intimate contact with the fixed mold member 14 by the fluid cylinders 140A and 140B, to increase the distance of the cavity 60 in the mold opening direction. The pressurized fluid of a nitrogen gas having a pressure of 50 kg/cm$^2$-G was introduced into the molten resin 62 through the pressurized fluid introduction portion 150. The movement of the movable platen 20 was terminated when it was moved 15 mm. The introduction of the pressurized fluid was continued to form a hollow structure 64 in the resin 62 in the cavity 60.

The above state is shown in the schematic cross-sectional view of FIG. 15, in which the distance of the cavity 60 in the mold opening direction increased, and a large-volume hollow structure was formed in the resin 62. The pressure of the pressurized fluid was maintained while the movement of the movable platen 20 was terminated after it had moved 15 mm above, and the resin was cooled and solidified for 75 seconds.

Then, the pressurized fluid introduction portion 150 was moved in the left-hand side direction in FIG. 15 (no moving mechanism is shown), and the pressurized fluid in the hollow structure 64 was released through a space around the pressurized fluid introduction portion 150. Then, the actuation of the fluid cylinders 140A and 140B was discontinued, and the mold was opened by actuating the movable platen moving means (see FIG. 16). The intermediate mold member 30 was moved together with the movable mold member 24, and stopped at a mold-opening halt position. In this state, the injection-molded article may be in a state in which it is in intimate contact with the intermediate mold member 30 when it is ejected with an injection-molded article ejection device (not shown) at a next step, so that it is sometimes difficult to release the injection-molded article from the mold.

In Example 4, after the mold was opened, the intermediate mold member 30 was energized to the movable mold member 24 side by the fluid cylinders 140A and 140B to move the intermediate mold member 30 back to the movable mold member 24 side (see FIG. 17), whereby the injection-molded article was brought into a state in which most part thereof was apart from the cavity wall surface 30A of the intermediate mold member 30. After the intermediate mold member 30 had been moved back to the movable mold member 24 side, the injection-molded article was released by actuating the injection-molded article ejection device (not shown). The injection-molded article was in a state where it was out of intimate contact with the intermediate mold member 30, and the injection-molded article was free of adhesion to the mold, so that it was easily taken out of the mold.

The above-obtained injection-molded article had an appearance free of a sink mark or distortion, and a wall thickness of about 2.7 mm in a portion having the large-volume hollow structure, and the injection-molded article was satisfactory.

EXAMPLE 5

Example 5 also relates to the injection molding method directed to the first aspect of the present invention. In the injection molding method in Example 5, there was used the mold apparatus in the fourth embodiment shown in FIGS. 18 to 24, and the same resin as that used in Example 4 was used.

Figure 18:
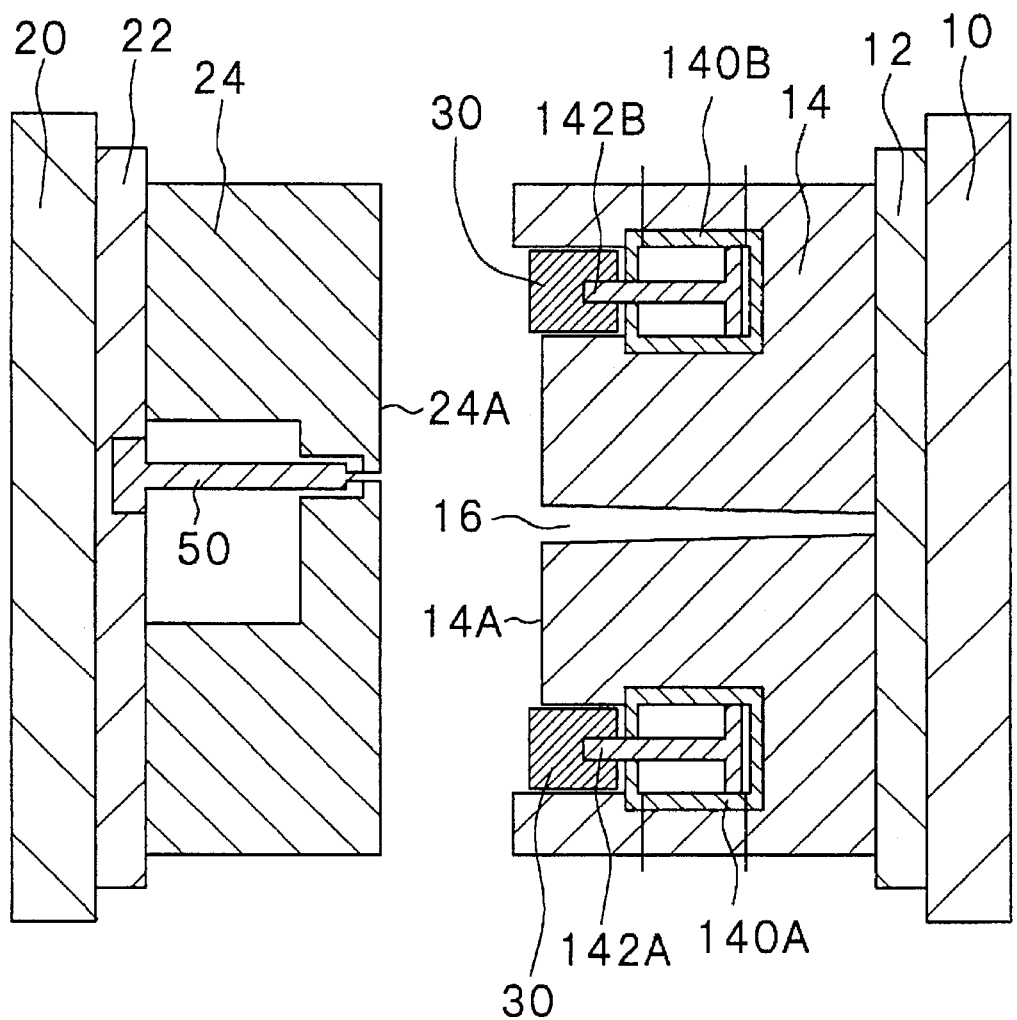
FIG. 18 is a schematic cross-sectional view of a mold apparatus used in Example 5 before a mold is clamped.

In Example 5, as FIG. 18 shows a schematic cross section, the intermediate mold member 30 was energized to the fixed mold member 14 side by the fluid cylinders 140A and 140B before the mold was clamped. After the preparation of the molding was completed, the mold was clamped by actuating the movable platen moving means as shown in FIG. 19. At this point of time, since the intermediate mold member 30 was energized to the fixed mold member 14 side, the resistance to the mold-clamping force was decreased. After the mold was clamped, the intermediate mold member 30 was energized to the movable mold member 24 by the fluid cylinders 140A and 140B to bring the intermediate mold member 30 into intimate contact with the movable mold member 24, as shown in FIG. 20.

After the clamping of the mold was completed, the molten resin 62 was injected into the cavity 60 of the mold through the molten resin injection portion 16, as FIG. 21 shows a schematic cross section. In the mold apparatus, the mold-clamping force of 350 metric tons was maintained by actuating the movable platen moving means, and the cavity 60 was arranged to have a distance of 7 mm in the mold opening and closing directions. In this case, the fluid cylinders 140A and 140B formed of hydraulic cylinders energized the intermediate mold member 30 in the left-hand-side direction in FIG. 21, so that the intermediate mold member 30 was in intimate contact with the movable mold member 24. The cavity 60 was formed not only of the cavity wall surfaces 14A and 30A of the fixed mold member 14 and the intermediate mold member 30 but also of the cavity wall surface 24A of the movable mold member 24, so that it was sufficient to apply solely to the movable mold member 24 a force which could withstand the pressure caused by the molten resin 62 injected into the cavity 60 and that it was sufficient for the fluid cylinders 140A and 140B to work to bring the intermediate mold member 30 into intimate contact with the movable mold member 24. Therefore, the fluid cylinders 140A and 140B can be decreased in capacity.

After the injection of the molten resin 62 into the cavity 60 was finished and at the point of time when the introduction of the pressurized fluid into the molten resin was initiated, the movable mold member 24 was moved in the mold opening direction by actuating the movable platen moving means with keeping the intermediate mold member 30 in intimate contact with the movable mold member 24 by the fluid cylinders 140A and 140B, to increase the distance of the cavity 60 in the mold opening direction. The pressurized fluid of a nitrogen gas having a pressure of 50 kg/cm$^2$-G was introduced into the molten resin 62 through the pressurized fluid introduction portion 150. The movement of the movable platen 20 was terminated when it was moved 15 mm. The introduction of the pressurized fluid was continued to form a hollow structure 64 in the resin 62 in the cavity 60. The above state is shown in the schematic cross-sectional view of FIG. 22, in which the distance of the cavity 60 in the mold opening direction increased, and the large-volume hollow structure 64 was formed in the resin 62. In the same manner as in Example 4, the pressure of the pressurized fluid was maintained while the movement of the movable platen 20 was terminated after it had moved 15 mm above and the resin was cooled and solidified for 75 seconds.

Then, the pressurized fluid introduction portion 150 was moved in the left-hand side direction in FIG. 22 (no moving mechanism is shown), and the pressurized fluid in the hollow structure 64 was released through a space around the pressurized fluid introduction portion 150. Then, the fluid cylinders 140A and 140B were reversibly actuated to energize the intermediate mold member 30 to the fixed mold member 14 side to move the intermediate mold member 30 back to the fixed mold member 14 side (see FIG. 23), whereby most part of the injection-molded article was out of contact with the cavity wall surface 30A of the intermediate mold member 30. Without the above procedure, the injection-molded article may pull the intermediate mold member 30 in the mold opening direction when the opening of the mold is initiated, so that it is sometimes difficult to release the injection-molded article from the mold or the mold is sometimes damaged.

Figure 24:
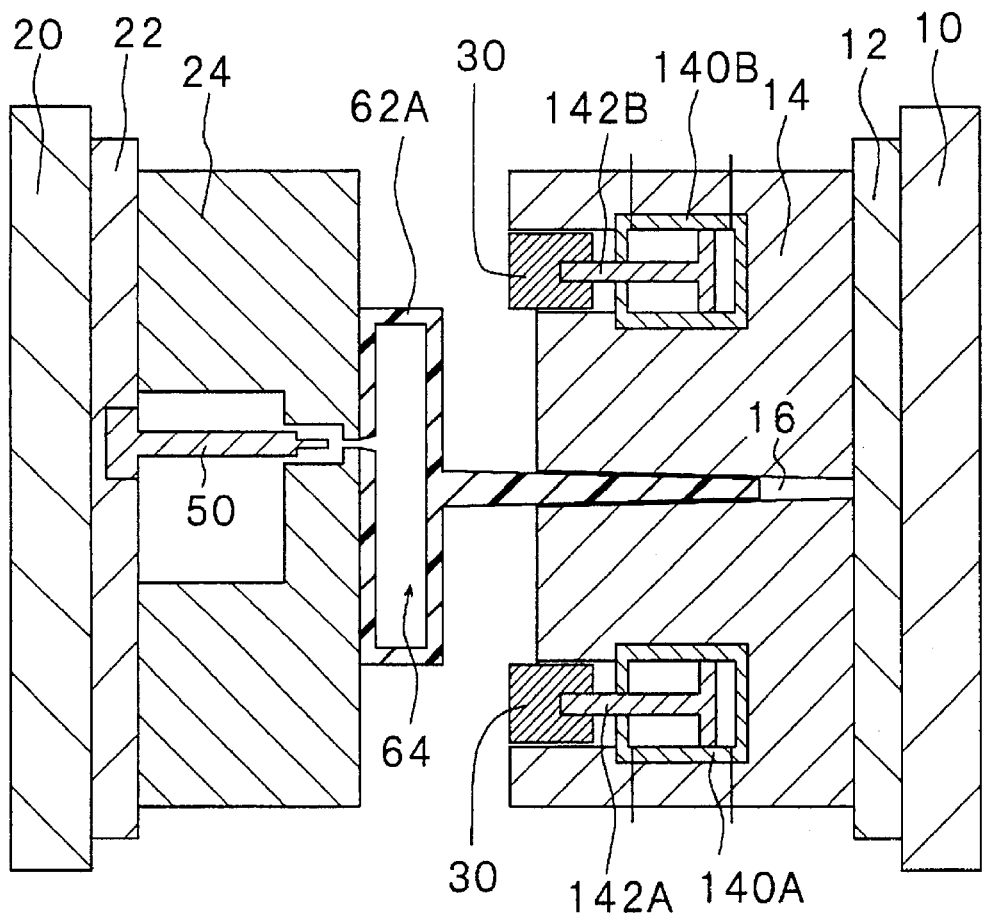
FIG. 24 is a schematic cross-sectional view of a mold apparatus used in Example 5 after a mold is opened.

Then, the mold was opened by actuating the movable platen moving means (see FIG. 24). The injection-molded article no longer pulled the intermediate mold member 30 in the mold opening direction, and there was no case where it was difficult to take out the injection-molded article or the mold was damaged. Further, the injection-molded article has an appearance free of a sink mark or distortion, and it had a large-volume hollow structure.

EXAMPLE 6

Example 6 relates to the injection molding method directed to the second aspect of the present invention. In the injection molding method in Example 6, there was used the mold apparatus in the fifth embodiment shown in FIGS. 25 to 30. The cavity 60 in the mold-clamped state as shown in FIG. 27 was arranged to have a distance of 6 mm in the mold opening and closing directions. The movable mold member 24 arranged to move together with the movable platen 20 was arranged to move at a distance of 14 mm in the mold opening direction by actuating the movable platen moving means. The cavity 60 in the state shown in FIG. 29 therefore had a distance of 20 mm in the mold opening and closing directions. FIG. 25 shows a state before the mold was clamped. In this state, the intermediate mold member 30 was energized toward the movable mold member 24 with the spring 32, and the intermediate mold member 30 was not fixed to the fixed mold member 14. Further, FIG. 27 shows a state of the mold in which the movable mold member 24 was moved forward by actuating the movable platen moving means and the mold was clamped at a high pressure. The intermediate mold member 30 was fixed to the fixed mold member 14 by the intermediate mold member fixing means 240A and 240B formed of clamp mechanisms (see FIGS. 26A and 26B) provided in the intermediate mold member 30 and the fixed mold member 14.

The resin and the injection molding conditions in Example 6 were the same as those in Example 1. The molten resin 62 was injected into the cavity 60 at an injection pressure of 1200 kgf/cm$^2$ through the molten resin injection portion 16. This state is shown in FIG. 28. After the injection of the molten resin 62 was finished, a dwell pressure of 800 kgf/cm$^2$ was applied to improve the imprintability of the emboss formed on the cavity wall surfaces to the resin.

Then, a pressurized fluid of nitrogen gas at 100 kg/cm$^2$-G was introduced into the molten resin 62 in the cavity 60 through the pressurized fluid introduction portion 150. In 1 second after the initiation of the introduction of the pressurized fluid, for preventing the leakage of the molten resin 62 through the parting faces of the mold, the movable mold member 24 was moved in the mold opening direction by actuating the movable platen moving means with keeping the intermediate mold member 30 fixed to the fixed mold member 14 by the intermediate mold member fixing means 240A and 240B and with keeping the intermediate mold member 30 in intimate contact with the movable mold member 24, to increase the distance of the cavity 60 in the mold opening direction. Finally, the movable platen 20 arranged to move together with the movable mold member 24 was moved back 14 mm by actuating the movable platen moving means to increase the volume of an injection-molded article having the hollow structure 64. This state is shown in FIG. 29.

Figure 30:
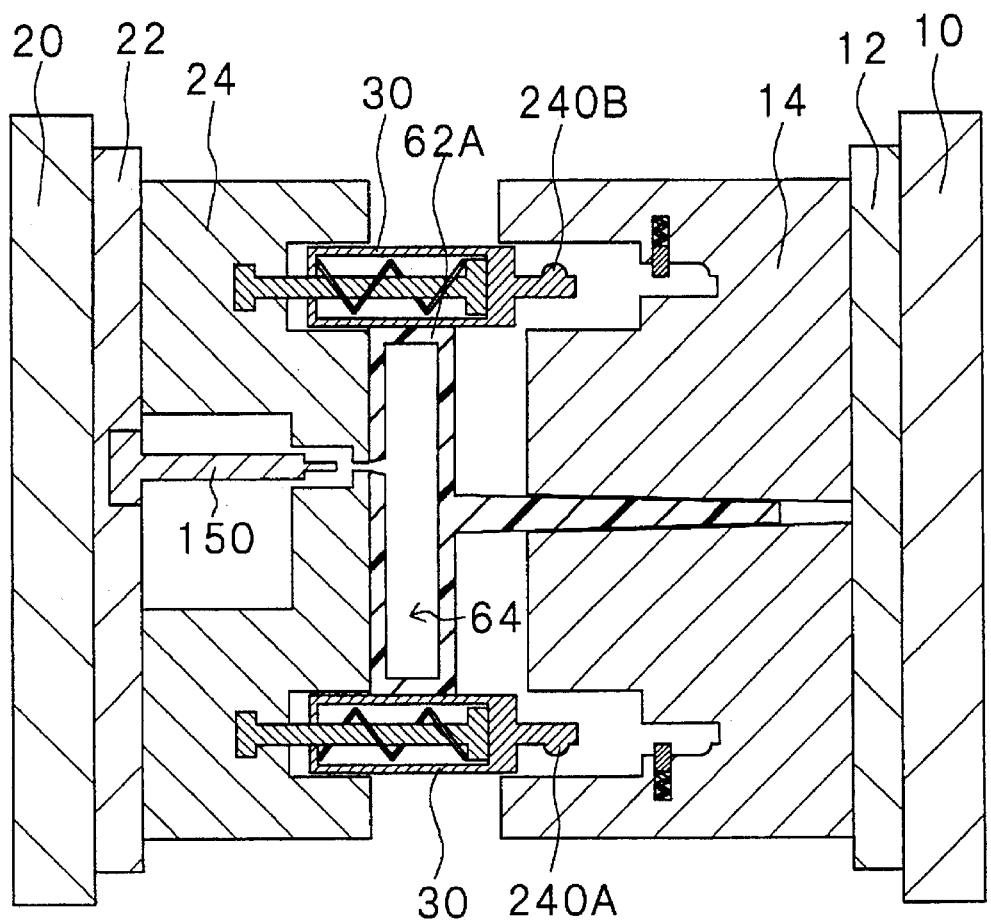
FIG. 30 is a schematic cross-sectional view of a mold apparatus used in Example 6 after a mold is opened.

Then, the resin in the cavity 60 was cooled and solidified for 100 seconds. Then, the pressurized fluid introduction portion 150 was moved back, and the pressurized fluid in the hollow structure 64 within the resin 62A was released into atmosphere through a space around the pressurized fluid introduction portion 150. Then, the mold was opened by actuating the movable platen moving means. This state is shown in FIG. 30. At this point of time, the clamp mechanism was disengaged by the force of the movable platen moving means in the mold opening direction, and the intermediate mold member 30 was released from a fixed state in which it had been fixed to the fixed mold member 14, and energized to the movable mold member 24 side with the spring 32. Finally, the injection-molded article was taken out of the mold with an injection-molded article ejection device (not shown) provided in the movable mold member 24.

EXAMPLE 7

Example 7 also relates to the injection molding method directed to the second aspect of the present invention. In the injection molding method in Example 7, there was used the mold apparatus in the sixth embodiment shown in FIGS. 31 to 35. The cavity 60 in the mold-clamped state as shown in FIG. 32 was arranged to have a distance of 6 mm in the mold opening and closing directions. The movable mold member 24 arranged to move together with the movable platen 20 was arranged to move at a distance of 14 mm in the mold opening direction by actuating the movable platen moving means. The cavity 60 in the state shown in FIG. 34 therefore had a distance of 20 mm in the mold opening and closing directions. FIG. 31 shows a state before the mold was clamped. Further, FIG. 32 shows a state of to the mold after the mold was clamped at a high pressure by moving the movable platen forward by actuating the movable platen moving means. The intermediate mold member 30 was fixed to the movable mold member 24 by the intermediate mold member fixing means 240A and 240B formed of clamp mechanisms (the same as those shown in FIGS. 26A and 26B) provided in the intermediate mold member 30 and the fixed mold member 14.

The resin and the injection molding conditions in Example 6 were the same as those in Example 1. The molten resin 62 was injected into the cavity 60 at an injection pressure of 1200 kgf/cm² through the molten resin injection portion 16. This state is shown in FIG. 33. After the injection of the molten resin 62 was finished, a dwell pressure of 800 kgf/cm² was applied to improve the imprintability of the emboss formed on the cavity wall surfaces to the resin.

Then, a pressurized fluid of nitrogen gas at 100 kg/cm²-G was introduced into the molten resin 62 in the cavity 60 through the pressurized fluid introduction portion 150. In 1 second after the initiation of the introduction of the pressurized fluid, for preventing the leakage of the molten resin 62 through the parting faces of the mold, the movable mold member 24 was moved in the mold opening direction by actuating the movable platen moving means with keeping the intermediate mold member 30 fixed to the movable mold member 24 by the intermediate mold member fixing means 240A and 240B and with keeping the intermediate mold member 30 in intimate contact with fixed mold member 14, to increase the distance of the cavity 60 in the mold opening direction. Finally, the movable platen 20 arranged to move together with the movable mold member 24 was moved back 14 mm by actuating the movable platen moving means to increase the volume of an injection-molded article having the hollow structure 64. This state is shown in FIG. 29.

Figure 35:
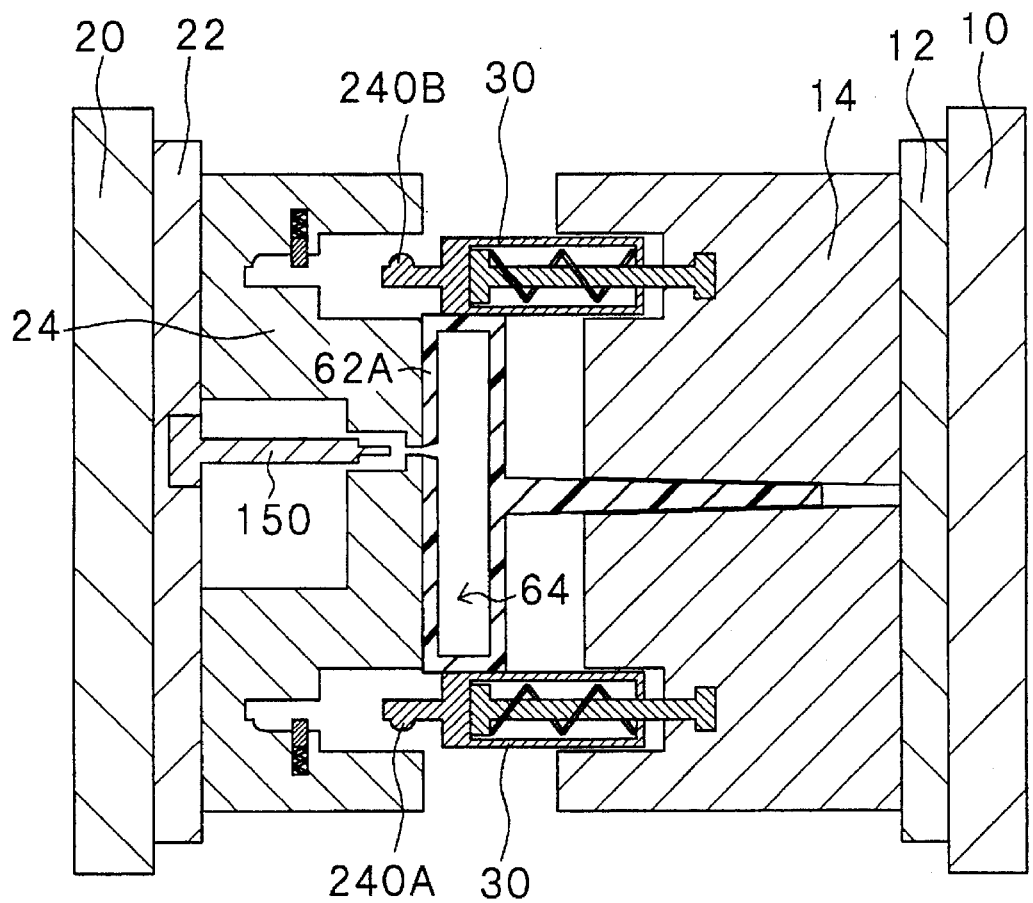
FIG. 35 is a schematic cross-sectional view of a mold apparatus used in Example 7 after a mold is opened.

Then, the resin in the cavity 60 was cooled and solidified for 100 seconds. Then, the pressurized fluid introduction portion 150 was moved back, and the pressurized fluid in the hollow structure 64 within the resin 62A was released into atmosphere through a space around the pressurized fluid introduction portion 150. Then, the mold was opened by actuating the movable platen moving means. This state is shown in FIG. 35. At this point of time, the clamp mechanisms were disengaged by the force of the movable platen moving means in the mold opening direction, and the intermediate mold member 30 was released from a fixed state in which it had been fixed to the movable mold member 24, and energized to the fixed mold member 14 side with the spring 32. Finally, the injection-molded article was taken out of the mold with an injection-molded article ejection device (not shown) provided in the movable mold member 24.

EXAMPLE 8

The injection molding was carried out with the same mold apparatus as that used in Example 6. The difference of Example 8 from Example 6 was that, after the molten resin was injected into the cavity, a pressure (a compressive force) in the mold closing direction was applied to the molten resin in the cavity by moving the movable mold member 24 in the mold closing direction by actuating the movable platen moving means with keeping the intermediate mold member 30 in intimate contact with the movable mold member 24.

The movable platen 20 was moved forward by actuating the movable platen moving means, to clamp the mold at a high pressure (see FIG. 27), and the movable mold member 24 was moved in the mold opening direction by actuating the movable platen moving means with keeping the intermediate mold member 30 fixed to the fixed mold member 14 and with keeping the intermediate mold member 30 in intimate contact with the movable mold member 24. This state was maintained. The resin and the injection molding conditions in Example 8 were the same as those in Example 6. Immediately after the injection of the molten resin 62 was finished, the movable platen 20 arranged to move together with the movable mold member 24 was moved 2 mm in the mold closing direction at a mold-clamping force of 100 metric tons by actuating the movable platen moving means, and this state was maintained for 2 seconds (see FIG. 28), whereby the compressive force was applied to the molten resin 62 in the cavity 60 to improve the imprintability of the emboss provided on the cavity wall surfaces to the resin. Alternatively, the movement of the movable mold member 24 may be initiated in the mold closing direction during the injection of the molten resin 62 into the cavity 60.

Then, the pressurized fluid was introduced into the molten resin 62 in the cavity 60 in the same manner as in Example 6. In 1 second after the initiation of the introduction of the pressurized fluid, for preventing the leakage of the molten resin 62 through the parting faces of the mold, the movable mold member 24 was moved in the mold opening direction by actuating the movable platen moving means with keeping the intermediate mold member 30 fixed to the fixed mold member 14 by the intermediate mold member fixing means 240A and 240B and with keeping the intermediate mold member 30 in intimate contact with the movable mold member 24, to increase the distance of the cavity 60 in the mold opening direction. Finally, the movable platen 20 arranged to move together with the movable mold member 24 was moved back 14 mm by actuating the movable platen moving means to increase the volume of an injection-molded article having the hollow structure 64. This state is shown in FIG. 29. Then, in the same manner as in Example 6, the resin in the cavity 60 was cooled and solidified, the pressurized fluid in the hollow structure 64 within the resin 62A was released into atmosphere, and then, the mold was opened by actuating the movable platen moving means. This state is shown in FIG. 30. Finally, the injection-molded article was taken out of the mold with an injection-molded article ejection device (not shown) provided in the movable mold member 24. The so-obtained injection-molded article had an intended hollow structure and had an excellent appearance free of a sink mark.

In Example 8, the cavity was arranged to have a greater distance in the mold opening and closing directions than it was generally required to have, while the movement of the movable mold member 24 in the mold opening direction from the mold-clamping position may be initiated before, on or after the injection of the molten resin is initiated, and the movable mold member 24 may be moved in the mold closing direction while or after the molten resin is injected into the cavity.

The present invention has been explained with reference to the preferred embodiments hereinabove, while the present invention shall not be limited thereto. The structures of the mold apparatus, the injection molding conditions, the resins and the like in Examples are illustrative examples, and may be properly altered. The timing in initiating and finishing the injection of the molten resin, the timing in initiating the introduction of the pressurized fluid and the timing in initiating and terminating the movement of the movable mold member shall not be limited to those explained in Examples, and can be set as explained with reference to FIGS. 36 and 37. Further, the injection molding method in Example 2 in which the compressive force is exerted on the molten resin in the cavity may be applied to the injection molding method in each of Examples 3 to 5, and the injection molding method explained in Example 8 may be applied to the injection molding method in Example 7. The constitution of the mold apparatus shown in each of FIGS. 1 to 35, 38 and 39 are presented not for showing any detailed constitution but for explaining main operations in the present invention.

In the present invention, the cavity is constituted of the cavity wall surface of the movable mold member as well, so that it is sufficient to exert solely on the movable mold member a force which can withstand the pressure caused by the molten resin injected into the cavity, and the structure of the mold apparatus can be therefore simplified. It is therefore not necessary to remodel the mold apparatus when the above force can be generated by the movable platen moving means. Further, the distance of the cavity is increased by moving the movable mold member in the mold opening direction with keeping the intermediate mold member in intimate contact with the fixed mold member or the movable mold member, so that the leakage of the molten resin out of the cavity can be reliably prevented.

When a fluid cylinder is used as the intermediate mold member sliding means, the fluid cylinder can be decreased in capacity. Further, when the fluid cylinder is used, the pressing force of the intermediate mold member on the fixed mold member or the movable mold member can be accurately set by controlling the pressure of the fluid cylinder. Further, the pressing force can be accurately controlled without being affected by the position of the movable mold member.

Moreover, when a fluid cylinder is used as the intermediate mold member sliding means, the intermediate mold member can be energized to the movable mold member side by the fluid cylinder while or after the mold is opened. Therefore, an injection-molded article can be smoothly released from the mold when the injection-molded article is ejected from the mold with, for example, an injection-molded article ejection device. Alternatively, the intermediate mold member can be energized to the fixed mold member side by the fluid cylinder before the mold is opened. As a result, when the mold is opened, the difficulty in taking out the injection-molded article or damage to the mold can be prevented.

When a fluid cylinder is used as the intermediate mold member sliding means, the intermediate mold member can be positioned as required, and the resistance to the mold-clamping force in the mold-clamping step can be decreased.

What is claimed is:

1. An injection-molding method for producing a hollow-structured injection-molded article, using an injection molding machine having a mold apparatus with a cavity, said mold apparatus comprising (A) a fixed mold member having a cavity wall surface forming the cavity, (B) a movable mold member movable in the mold opening and closing directions and having a cavity wall surface forming the cavity, (C) an intermediate mold member which is provided between the fixed mold member and the movable mold member, is slidable in the mold opening and closing directions between the fixed mold member and the movable mold member and has at least one cavity wall surface which forms the cavity and is used for forming a side wall of the article, and (D) at least one intermediate mold member sliding means for sliding the intermediate mold member in the mold opening and closing directions, which is provided in the movable mold member and is comprised of a fluid cylinder having an output rod connected to the intermediate mold member, the method including the steps of injecting a molten resin into the cavity formed of the cavity wall surfaces of the fixed mold member, the intermediate mold member and the movable mold member, increasing the distance of the cavity in the mold opening direction by moving the movable mold member in the mold opening direction with keeping the intermediate mold member in intimate contact with the fixed mold member by the intermediate mold member sliding means, and introducing a pressurized fluid into the molten resin in the cavity, thereby to form a hollow structure in the resin, and energizing the intermediate mold member in the mold opening direction by the intermediate mold member sliding means to change the relative positions of the intermediate mold member and the movable mold member while or after the mold is opened.

2. The injection molding method according to claim 1, wherein a pressure in the mold closing direction is applied to the molten resin in the cavity by moving the movable mold member in the mold closing direction with keeping the intermediate mold member in intimate contact with the fixed mold member by the intermediate mold member sliding means while or after the molten resin is injected into the cavity, and then, increasing the distance of the cavity in the mold opening direction by moving the movable mold member in the mold opening direction while or at the point of time when the pressurized fluid is introduced into the molten resin in the cavity.

3. The injection molding method according to claim 1, wherein the injection molding machine further comprises (a) a movable platen to which the movable mold member is attached, and (b) a movable platen moving means to which the movable platen is attached, for moving the movable platen, and the movable mold member is moved by actuating the movable platen moving means.

4. The injection molding method of claim 1, wherein the intermediate mold member is brought into intimate contact with the fixed mold member by energizing the intermediate mold member with the intermediate mold member sliding means when the mold is clamped.

5. A mold apparatus for use with an injection molding machine for producing a hollow-structured injection-molded article by injecting a molten resin into a cavity, increasing the distance of the cavity in the mold opening direction and introducing a pressurized fluid into the molten resin in the cavity, thereby to form a hollow structure in the resin, the mold apparatus comprising (A) a fixed mold member having a cavity wall surface forming the cavity, (B) a movable mold member movable in the mold opening and closing directions and having a cavity wall surface forming the cavity, (C) an intermediate mold member which is provided between the fixed mold member and the movable mold member, is slidable in the mold opening and closing directions between the fixed mold member and the movable mold member and has at least one cavity wall surface which forms the cavity and is used for forming a side wall of the article, (D) at least one intermediate mold member sliding means for sliding the intermediate mold member in the mold opening and closing directions, which is provided in the movable mold member and is comprised of a fluid cylinder having an output rod connected to the intermediate mold member for keeping the intermediate mold member in intimate contact with the fixed mold member when the distance of the cavity in the mold opening direction is increased by moving the movable mold member in the mold opening direction and for energizing the intermediate mold member in the mold opening direction to change the relative positions of the intermediate mold member and the movable mold member while or after the mold is opened, (E) molten resin injection means for injecting the molten resin into the cavity, and (F) pressurized fluid introduction means for introducing the pressurized fluid into the molten resin in the cavity.

6. The mold apparatus according to claim 5, wherein the movable mold member is attached to a movable platen provided in the injection molding machine, the movable platen is attached to a movable platen moving means provided in the injection molding machine, and the movable mold member is moved by actuating the movable platen moving means.

7. The mold apparatus according to claim 5, wherein the intermediate mold member is brought into intimate contact with the fixed mold member by energizing the intermediate mold member with the intermediate mold member sliding means when the mold is clamped.

* * * * *